(12) United States Patent
Yoh et al.

(10) Patent No.: US 10,386,078 B2
(45) Date of Patent: Aug. 20, 2019

(54) AIR CONDITIONING SYSTEM

(71) Applicant: DAIKIN INDUSTRIES, LTD., Osaka-shi, Osaka (JP)

(72) Inventors: Hiroshi Yoh, Sakai (JP); Michio Moriwaki, Sakai (JP); Masakazu Okamoto, Sakai (JP)

(73) Assignee: Daikin Industries, Ltd., Osaka (JP)

(*) Notice: Subject to any disclaimer, the term of this patent is extended or adjusted under 35 U.S.C. 154(b) by 432 days.

(21) Appl. No.: 14/612,015

(22) Filed: Feb. 2, 2015

(65) Prior Publication Data

US 2015/0219342 A1 Aug. 6, 2015

(30) Foreign Application Priority Data

Feb. 3, 2014 (JP) ................................. 2014-018811

(51) Int. Cl.
*F24D 5/12* (2006.01)
*F24D 11/02* (2006.01)
(Continued)

(52) U.S. Cl.
CPC ............ *F24D 11/0271* (2013.01); *F24D 5/12* (2013.01); *F24D 12/02* (2013.01);
(Continued)

(58) Field of Classification Search
CPC .... F24D 11/0271; F24D 5/12; F24D 19/1087; F24D 2220/042; F24D 2200/123; F24D 2200/32; F24D 2200/04; F24D 12/02; F24F 2203/02; F24F 11/0012; F24F 2011/0064; Y02B 30/14; F25B 2600/01; F25B 2600/23; F25B 2500/02; F25B 29/00

See application file for complete search history.

(56) References Cited

U.S. PATENT DOCUMENTS 3,996,998 A * 12/1976 Garst ...................... F24F 11/00
165/233
4,102,390 A * 7/1978 Harnish ............... F24D 19/1087
165/232
(Continued)

FOREIGN PATENT DOCUMENTS

JP 64-54160 A 3/1989
JP 2010-203709 A 9/2010

*Primary Examiner* — Cassey D Bauer
*Assistant Examiner* — Miguel A Diaz
(74) *Attorney, Agent, or Firm* — Global IP Counselors, LLP

(57) ABSTRACT

An air conditioning system includes a heat pump unit including a radiator usable with a refrigerant, a gas furnace unit including a heating section arranged to heat passing air, a blower arranged to generate an air flow that passes through the radiator and the heating section, a first temperature sensor provided in a room, and a controller configured to control each action of the heat pump unit, the gas furnace unit, and the blower. The temperature sensor detects an indoor temperature in the room. The controller causes the gas furnace unit to operate as a heat source unit when a difference value obtained by subtracting the indoor temperature from a set temperature is equal to or greater than a first threshold at startup, and causes the heat pump unit to operate as a heat source unit when the difference value is less than the first threshold at startup.

7 Claims, 10 Drawing Sheets

(51) Int. Cl.
  *F24D 19/10*   (2006.01)
  *G05D 23/12*   (2006.01)
  *G05D 23/185*  (2006.01)
  *F25B 29/00*   (2006.01)
  *F24D 12/02*   (2006.01)

(52) U.S. Cl.
  CPC .......... *F24D 19/1087* (2013.01); *F25B 29/00* (2013.01); *F24D 2200/04* (2013.01); *F24D 2200/123* (2013.01); *F24D 2200/32* (2013.01); *F24D 2220/042* (2013.01); *F25B 2500/02* (2013.01); *F25B 2600/01* (2013.01); *F25B 2600/23* (2013.01); *Y02B 30/13* (2018.05); *Y02B 30/14* (2013.01)

(56) References Cited

U.S. PATENT DOCUMENTS

| | | | | |
|---|---|---|---|---|
| 4,143,707 | A * | 3/1979 | Lewis | F24D 11/0271 165/242 |
| 4,178,988 | A * | 12/1979 | Cann | F24D 11/0271 165/242 |
| 4,191,023 | A * | 3/1980 | Sisk | F24D 11/0271 62/79 |
| 4,476,920 | A * | 10/1984 | Drucker | F24D 19/1087 165/242 |
| 4,627,483 | A * | 12/1986 | Harshbarger, III | F24D 19/1039 237/2 A |
| 4,703,795 | A * | 11/1987 | Beckey | F24D 19/1039 165/240 |
| 5,367,601 | A * | 11/1994 | Hannabery | F24D 19/1087 236/91 F |
| 6,176,306 | B1 * | 1/2001 | Gault | F24D 19/1087 165/240 |
| 6,729,390 | B1 * | 5/2004 | Toth | F24D 12/02 165/240 |
| 9,557,067 | B2 * | 1/2017 | Kojima | F24D 5/02 |
| 2004/0118933 | A1 * | 6/2004 | Readio | F24D 12/02 237/2 B |
| 2005/0150650 | A1 * | 7/2005 | Helt | F24D 12/02 165/240 |
| 2009/0114732 | A1 * | 5/2009 | Hawkins | F24D 5/12 237/12 |
| 2010/0070089 | A1 * | 3/2010 | Harrod | F24F 11/0086 700/277 |
| 2010/0090017 | A1 * | 4/2010 | Naghshineh | F24H 9/2085 237/2 B |
| 2012/0248210 | A1 * | 10/2012 | Warren | F24F 11/0012 236/1 C |
| 2012/0248211 | A1 * | 10/2012 | Warren | F24F 11/0012 236/1 C |
| 2012/0248212 | A1 * | 10/2012 | Storm | F24D 19/1087 237/12 |
| 2013/0248609 | A1 * | 9/2013 | Aspeslagh | F24D 3/08 237/8 A |
| 2014/0203092 | A1 * | 7/2014 | Broniak | F24D 19/1087 237/12 |
| 2014/0260358 | A1 * | 9/2014 | Leete | F25B 29/003 62/79 |
| 2015/0057814 | A1 * | 2/2015 | Mighdoll | F24F 11/0012 700/278 |
| 2015/0090803 | A1 * | 4/2015 | Okamoto | F24D 19/1087 237/2 A |
| 2015/0219342 | A1 * | 8/2015 | Yoh | F24D 11/0271 126/116 A |
| 2015/0219343 | A1 * | 8/2015 | Moriwaki | F24D 5/12 237/2 B |
| 2015/0316303 | A1 * | 11/2015 | Berson | F25B 30/06 62/115 |
| 2016/0195311 | A1 * | 7/2016 | Li | F25B 13/00 62/115 |
| 2016/0301344 | A1 * | 10/2016 | Pepe | H02P 9/04 |
| 2016/0341434 | A1 * | 11/2016 | Kojima | F24F 11/006 |

\* cited by examiner

| tb1 | ASSESSMENT SIGNAL INDICATING LARGE DIFFERENCE VALUE | ASSESSMENT SIGNAL INDICATING SMALL DIFFERENCE VALUE |
|---|---|---|
| ASSESSMENT SIGNAL INDICATING LOW OUTDOOR AIR TEMPERATURE<br>cl1 | GF UNIT DRIVE SIGNAL<br>HP UNIT STOP SIGNAL<br>cl2 | GF UNIT DRIVE SIGNAL<br>HP UNIT STOP SIGNAL |
| ASSESSMENT SIGNAL INDICATING HIGH OUTDOOR AIR TEMPERATURE<br>cl3 | GF UNIT DRIVE SIGNAL<br>HP UNIT STOP SIGNAL | GF UNIT STOP SIGNAL<br>HP UNIT DRIVE SIGNAL<br>cl4 |

FIG. 7

AIR CONDITIONING SYSTEM

CROSS-REFERENCE TO RELATED APPLICATIONS

This application claims priority under 35 U.S.C. § 119 to Japanese Patent Application No. 2014-018811, filed Feb. 3, 2014. The entire disclosure of Japanese Patent Application No. 2014-018811 is hereby incorporated herein by reference.

FIELD OF THE INVENTION

The present invention relates to an air conditioning system provided with a gas furnace unit and a heat pump unit.

BACKGROUND

In the past there have been air conditioning systems provided with a gas furnace unit and a heat pump unit, that perform air conditioning in a space to be air-conditioned. Japanese Laid-open Patent Publication No. 64-54160, for example, discloses an air conditioning system provided with a gas furnace unit and a heat pump unit, the air conditioning system being configured so as to select the gas furnace unit as a heat source unit when the outdoor air temperature is less than a predetermined temperature upon initiation of operation, and to select the heat pump unit as a heat source unit when the outdoor air temperature is equal to or greater than a predetermined temperature upon initiation of operation.

SUMMARY

Technical Problem

However, in the air conditioning system disclosed in Patent Literature 1, air conditioning having excellent amenity may be difficult to realize in some cases, because the parameter used in determining whether to select the gas furnace unit or the heat pump unit as the heat source unit upon initiation of operation is the outdoor air temperature.

An object of the present invention is therefore to provide an air conditioning system configured and arranged to realize air conditioning having excellent amenity.

Solution to Problem

An air conditioning system according to a first aspect of the present invention comprises a heat pump unit, a gas furnace unit, a blower, a first temperature sensor, and a controller. The heat pump unit includes a radiator for a refrigerant. The gas furnace unit includes a heating section. The heating section heats passing air. The blower generates an air flow which passes through the radiator and the heating section. The first temperature sensor is provided in a room and detects an indoor temperature which is the temperature in the room. The controller controls each action of the heat pump unit, the gas furnace unit, and the blower. The controller causes the gas furnace unit to operate as a heat source unit when a difference value which is a value obtained by subtracting the indoor temperature from a set temperature is equal to or greater than a first threshold at startup. The controller causes the heat pump unit to operate as a heat source unit when the difference value which is the value obtained by subtracting the indoor temperature from the set temperature is less than the first threshold at startup.

In the air conditioning system according to the first aspect of the present invention, the controller causes the gas furnace unit to operate as the heat source unit when the difference value which is the value obtained by subtracting the indoor temperature from the set temperature is equal to or greater than the first threshold at startup, and causes the heat pump unit to operate as the heat source unit when the difference value is less than the first threshold at startup. The air conditioning system is thereby configured so that the heat pump unit or the gas furnace unit, whichever is more capable of realizing excellent amenity, is operated as the heat source unit upon startup of the air conditioning system. Specifically, when the difference value is large, the indoor temperature can be brought close to the set temperature in less time by causing the gas furnace unit to operate as the heat source unit than by causing the heat pump unit to operate as the heat source unit. Amenity is therefore enhanced. When the difference value is small, the indoor temperature is more easily maintained near the set temperature by causing the heat pump unit to operate as the heat source unit than by causing the gas furnace unit to operate as the heat source unit, and amenity is enhanced. Consequently, air conditioning having excellent amenity is realized.

An air conditioning system according to a second aspect of the present invention is the air conditioning system according to the first aspect of the present invention, wherein the controller causes the heat pump unit to operate as the heat source unit instead of the gas furnace unit when the difference value becomes less than a second threshold while the gas furnace unit is operating as the heat source unit.

In the air conditioning system according to the second aspect of the present invention, the controller causes the heat pump unit to operate as the heat source unit instead of the gas furnace unit when the difference value becomes less than a second threshold while the gas furnace unit is operating as the heat source unit. The heat source unit thereby switches to the heat pump unit when the indoor temperature has reached a temperature near the set temperature while the gas furnace unit is operating as the heat source unit. The indoor temperature is thereby easily maintained near the set temperature, and amenity is further enhanced.

An air conditioning system according to a third aspect of the present invention is the air conditioning system according to the first or second aspect of the present invention, wherein the controller causes the gas furnace unit to operate as the heat source unit instead of the heat pump unit when the difference value becomes equal to or greater than a third threshold while the heat pump unit is operating as the heat source unit.

In the air conditioning system according to the third aspect of the present invention, the controller causes the gas furnace unit to operate as the heat source unit instead of the heat pump unit when the difference value becomes equal to or greater than a third threshold while the heat pump unit is operating as the heat source unit. The heat source unit thereby switches to the gas furnace unit when the difference between the indoor temperature and the set temperature becomes large while the heat pump unit is operating as the heat source unit. The indoor temperature can thereby easily approach the set temperature even when the difference between the indoor temperature and the set temperature becomes large while the air conditioning system is running, and amenity is further enhanced.

An air conditioning system according to a fourth aspect of the present invention is the air conditioning system according to any of the first through third aspects of the present invention, further comprising a second temperature sensor.

The second temperature sensor detects an outdoor air temperature which is the temperature of outside air. The controller causes the gas furnace unit to operate as the heat source unit rather than causing the heat pump unit to operate as the heat source unit, regardless of the difference value, when the outdoor air temperature is less than a first standard value at startup.

In the air conditioning system according to the fourth aspect of the present invention, the controller causes the gas furnace unit to operate as the heat source unit rather than causing the heat pump unit to operate as the heat source unit, regardless of the difference value, when the outdoor air temperature is less than a first standard value at startup. The energy efficiency of the air conditioning system upon initiation of operation thereof is thereby enhanced. Specifically, in conditions where the outdoor air temperature is below the standard value, operation of the gas furnace unit as the heat source unit is more energy efficient than operation of the heat pump unit as the heat source unit. Consequently, air conditioning having excellent energy efficiency is realized at startup of the air conditioning system.

The energy efficiency is expressed using, e.g., a coefficient of performance (COP) as a standard, and is specifically a value obtained by dividing the capacity of the device by an energy consumption. The capacity of the device is, e.g., a thermal load capacity of the heat pump unit or the gas furnace unit, and is expressed in watts or other units. The energy consumption is, e.g., the electric power consumption of the heat pump unit or the gas consumption of the gas furnace unit, and is expressed in watts or other units.

Advantageous Effects of Invention

In the air conditioning system according to the first aspect of the present invention, the heat pump unit or the gas furnace unit, whichever is more capable of realizing excellent amenity, is operated as the heat source unit upon startup of the air conditioning system. Consequently, air conditioning having excellent amenity is realized.

In the air conditioning system according to the second aspect of the present invention, the indoor temperature is easily maintained near the set temperature, and amenity is further enhanced.

In the air conditioning system according to the third aspect of the present invention, the indoor temperature can easily approach the set temperature even when the difference between the indoor temperature and the set temperature becomes large while the air conditioning system is running, and amenity is further enhanced.

In the air conditioning system according to the fourth aspect of the present invention, air conditioning having excellent energy efficiency is realized at startup of the air conditioning system.

BRIEF DESCRIPTION OF THE DRAWINGS

FIG. 7 is a conceptual diagram of the table referred to in the drive signal generation part.

DETAILED DESCRIPTION OF EMBODIMENT(S)

An air-warming system 10 according to an embodiment of the present invention is described below with reference to the drawings. The following embodiment is a specific example of the present invention and is not intended to limit the technical range of the present invention, and modifications can be made as appropriate provided that there is no departure from the scope of the invention.

(1) Air-Warming System 10

Figure 1:
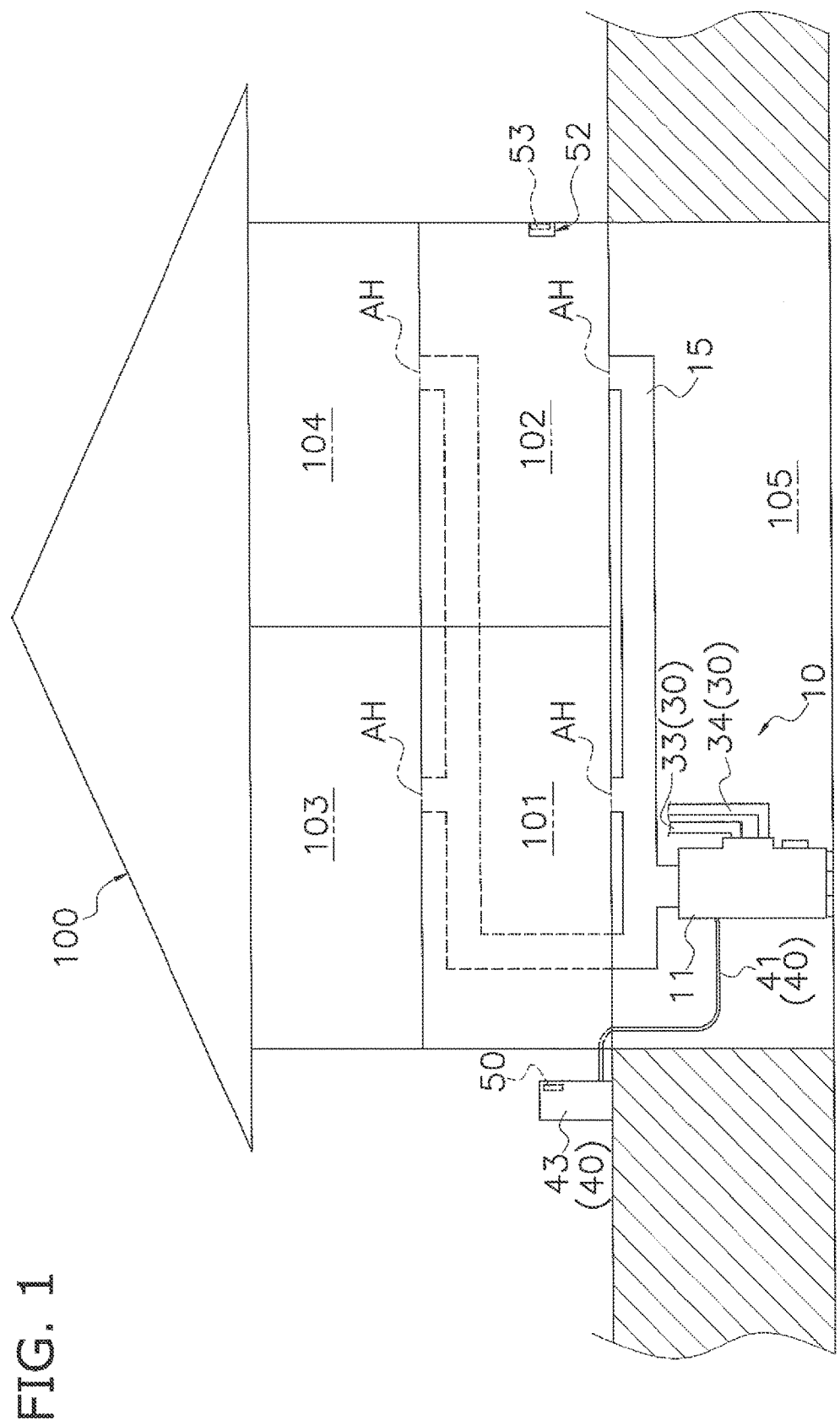
FIG. 1 is a schematic diagram showing the arrangement of an air-warming system according to an embodiment of the present invention.

FIG. 1 is a schematic diagram showing the arrangement of the air-warming system 10 according to an embodiment of the present invention. Applications for the air-warming system 10 include a one-story building such as a house, and low-rise buildings. In the present embodiment, the air-warming system 10 is installed in a two-story house 100.

The house 100 is furnished with rooms 101 and 102 on a first floor, and rooms 103 and 104 on a second floor. A vent hole AH is formed in each of the rooms 101, 102, 103, and 104. The house 100 is also furnished with a basement 105.

The air-warming system 10, which is a so-called ducted air-warming system, comprises primarily a main body casing 11, a duct 15, a fan unit 20, a gas furnace unit (written below as a GF unit) 30, a heat pump unit (written below as an HP unit) 40, and an electrical component unit 52. The air-warming system 10 operates either the GF unit 30 or the HP unit 40 as a heat source unit and performs air conditioning in the rooms 101 to 104 in accordance with a predetermined condition. The components are described below.

(2) Details of Components (2-1) Main Body Casing 11

Figure 2:
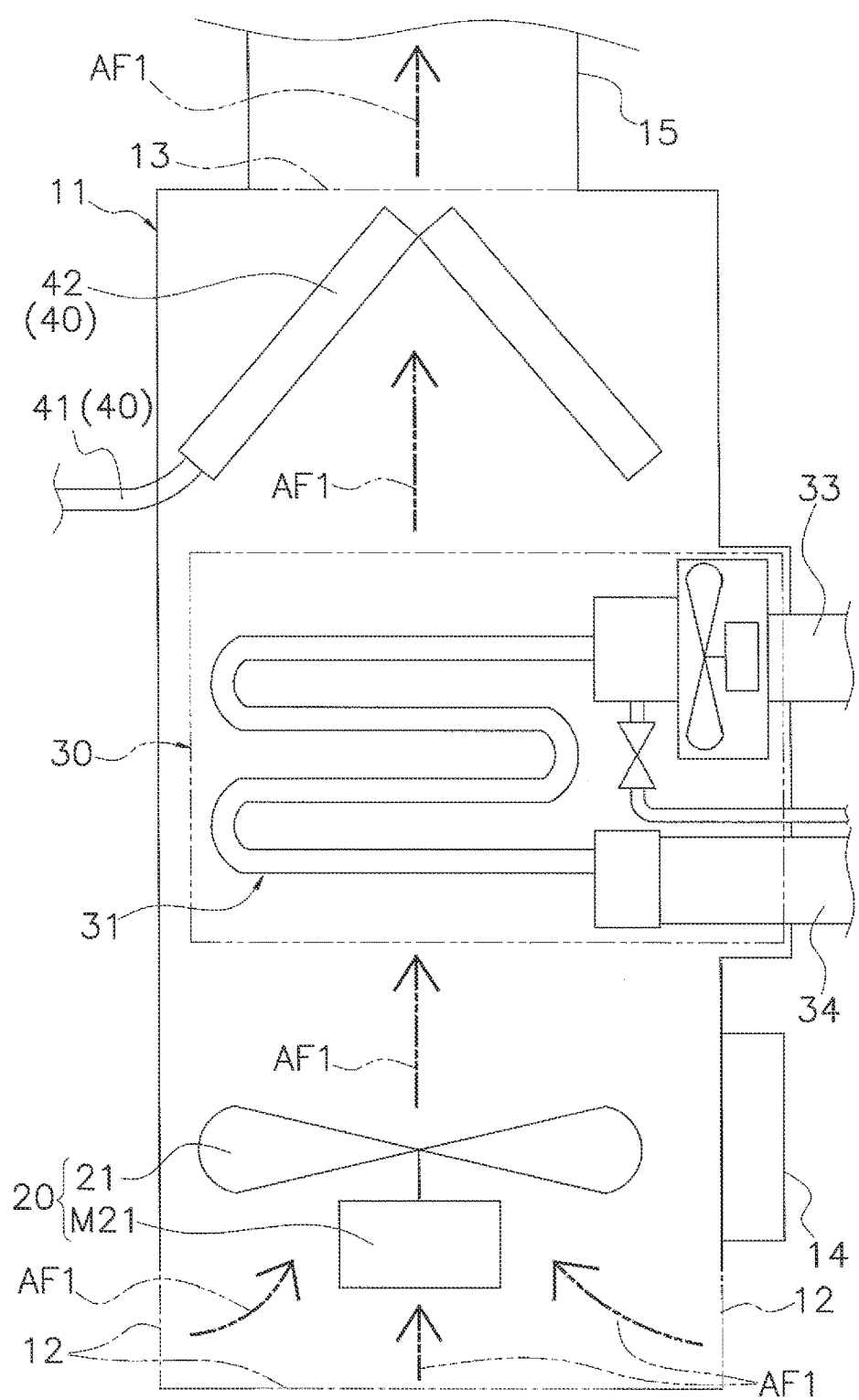
FIG. 2 is a schematic diagram of the interior of the main body casing.

FIG. 2 is a schematic diagram of the interior of the main body casing 11. The main body casing 11 is, for example, a metal case. The fan unit 20, the GF unit 30, and a usage-side heat exchanger 42 (described hereinafter) of the HP unit 40 are placed in the interior of the main body casing 11. Intake ports 12 for taking in air are formed in the bottom of the main body casing 11 and the sides near the bottom. An exhaust port 13 for exhausting the air taken in is formed in the top of the main body casing 11. An electric component box 14 for accommodating various electric components is provided to the side of the main body casing 11. A ventilation port (not shown) for taking in air for cooling the electric components installed in the interior is formed in the electric component box 14.

(2-2) Duct 15

The duct 15 is a metal pipe for feeding air. The duct 15 is connected to the main body casing 11 via the exhaust port 13, and communicates with the interior of the main body casing 11. The duct 15 extends upward from the portion connecting with the main body casing 11, and branches in two partway through. One branch of the bifurcated duct 15 extends along the ceiling of the basement 105, and further branches partway through to connect to the vent hole AH of the room 101 and the vent hole AH of the room 102, thereby communicating with the rooms 101 and 102. The other branch of the bifurcated duct 15 extends upward along the ceiling of the first floor, and further branches partway through to connect to the vent hole AH of the room 103 and the vent hole AH of the room 104, thereby communicating with the rooms 103 and 104. The interior of the main body casing 11 and the rooms 101 to 104 communicate via the duct 15 placed in this manner.

(2-3) Fan Unit 20

The fan unit 20 (equivalent to the "blower" set forth in the claims) is a unit for generating an air flow AF1. The fan unit 20 is placed near the bottom inside the main body casing 11. The fan unit 20 has a fan 21 and a first fan motor M21.

The fan 21 is a blower such as, e.g., a propeller fan or a multi-blade fan. The fan 21 is connected to a rotating shaft of the first fan motor M21. The first fan motor M21 is connected via a cable (not shown) to a first power supply part 211 accommodated in the electric component box 14, and is supplied with power from the first power supply part 211. When the first fan motor M21 is energized and driven, the fan 21 rotates. When the fan 21 rotates, the air flow AF1 is generated.

The air flow AF1 flows via the intake ports 12 into the main body casing 11, passes sequentially through a heat exchange section 31 (described hereinafter) of the GF unit 30 and the usage-side heat exchanger 42 (described hereinafter) of the HP unit 40, and then flows out of the main body casing 11 via the exhaust port 13, and flows into the rooms 101 to 104 via the duct 15 and the vent holes AH.

(2-4) GF Unit (Gas Furnace Unit) 30

Figure 3:
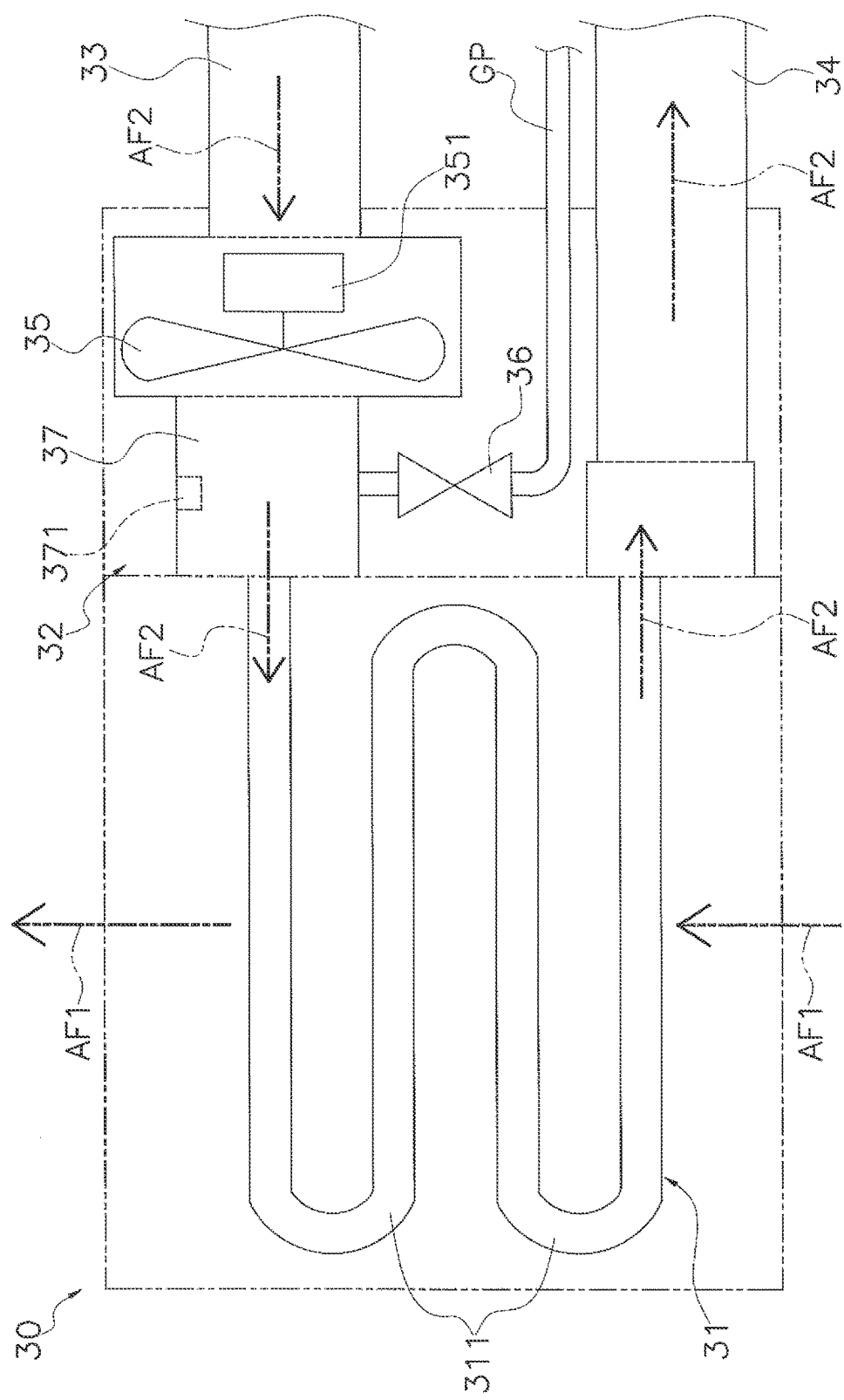
FIG. 3 is a schematic diagram of the gas furnace unit.

FIG. 3 is a schematic diagram of the GF unit 30. The GF unit 30 is driven as the heat source unit when a predetermined condition is fulfilled during operation. The GF unit 30 is including primarily the heat exchange section 31, a main body part 32, an air supply duct 33, and an exhaust duct 34.

(2-4-1) Heat Exchange Section 31

The heat exchange section 31 is provided in the flow path through which the air flow AF1 passes inside the main body casing 11. Specifically, the heat exchange section 31 includes a combustion gas pipe 311 placed inside the main body casing 11. When the air flow AF1 is generated while a combustion gas (described hereinafter) is present inside the combustion gas pipe 311, heat exchange takes place between the air flow AF1 and the heat exchange section 31. Specifically, when the GF unit 30 is operated as the heat source unit, the heat exchange section 31 functions as a "heating section" for heating the passing air flow AF1.

(2-4-2) Main Body Part 32

The main body part 32 is located adjacent to the heat exchange section 31. Accommodated inside the main body part 32 are primarily a fan 35, a gas valve 36, and a combustion part 37.

The fan 35 is a blower such as, e.g., a propeller fan or a multi-blade fan. The fan 35 is connected to a rotating shaft of a second fan motor 351. The second fan motor 351 is connected via a cable (not shown) to a second power supply part 352 placed inside the electric component box 14, and is supplied with power from the second power supply part 352. When the second fan motor 351 is energized and driven, the fan 35 rotates in association therewith and an air flow AF2 is generated. The air flow AF2 flows from outside into the main body part 32 via the air supply duct 33 connected to the main body part 32, passes through the combustion part 37 and the combustion gas pipe 311, and flows to the outside via the exhaust duct 34.

The gas valve 36 is a valve such as, e.g., an electromagnetic valve. The gas valve 36 is placed in a gas pipe GP extending from the outside of the main body part 32 to the combustion part 37. The gas pipe GP is a commercial gas pipe for supplying a fuel gas such as, e.g., liquefied natural gas or liquefied petroleum gas that has been gasified. The gas valve 36 is connected via a cable (not shown) to a gas valve opening/closing part 361 placed inside the electric component box 14, and the opening and closing of the gas valve is controlled. When the gas valve 36 is opened, the fuel gas flowing through the gas pipe GP flows into the combustion part 37 and mixes with air included in the air flow AF2. When the gas valve 36 is closed, the supply of fuel gas into the combustion part 37 is stopped.

The gas pipe GP is connected to the combustion part 37. A plug 371 is placed in the combustion part 37. The plug 371 is connected via a cable (not shown) to a plug power supply part 372 placed inside the electric component box 14, and is supplied with power. When the gas valve 36 is opened while the fan 35 is driven, the air flow AF2 and the fuel gas are mixed together inside the combustion part 37. In this state, when power is supplied from the plug power supply part 372 to the plug 371, electric discharge is produced and ignition takes place. The mixed gas thereby combusts to become the combustion gas.

One end of the combustion gas pipe 311 is connected to the combustion part 37, and the combustion gas flows as the air flow AF2 into the combustion gas pipe 311. Having flowed into the combustion gas pipe 311, the combustion gas exchanges heat with the air flow AF1 when passing through the combustion gas pipe 311, and then flows into the exhaust duct 34 connected to the other end of the combustion gas pipe 311.

(2-4-3) Air Supply Duct 33 and Exhaust Duct 34

The air supply duct 33 and the exhaust duct 34 are pipes, e.g., made of metal, and extending from the outside to the basement 105. The air supply duct 33 has an air supply port located outside, and the exhaust duct 34 has a discharge port located outside. The air supply duct 33 is connected to one end of the combustion gas pipe 311 via the combustion part 37 or the like, and the exhaust duct 34 is connected to the other end of the combustion gas pipe 311. The air supply duct 33 and the exhaust duct 34 extend along the ceiling of the basement 105, and the air supply port and exhaust port are secured to the outer wall or the like of the house 100 (not shown).

Outdoor air that has flowed into the air supply duct 33 via the air supply port when the fan 35 is driven passes through the combustion part 37 and flows into the exhaust duct 34. Exhaust gas that has flowed into the exhaust duct 34 when the fan 35 is driven passes through the exhaust duct 34 to be discharged out of the house 100.

(2-5) HP Unit (Heat Pump Unit) 40

Figure 4:
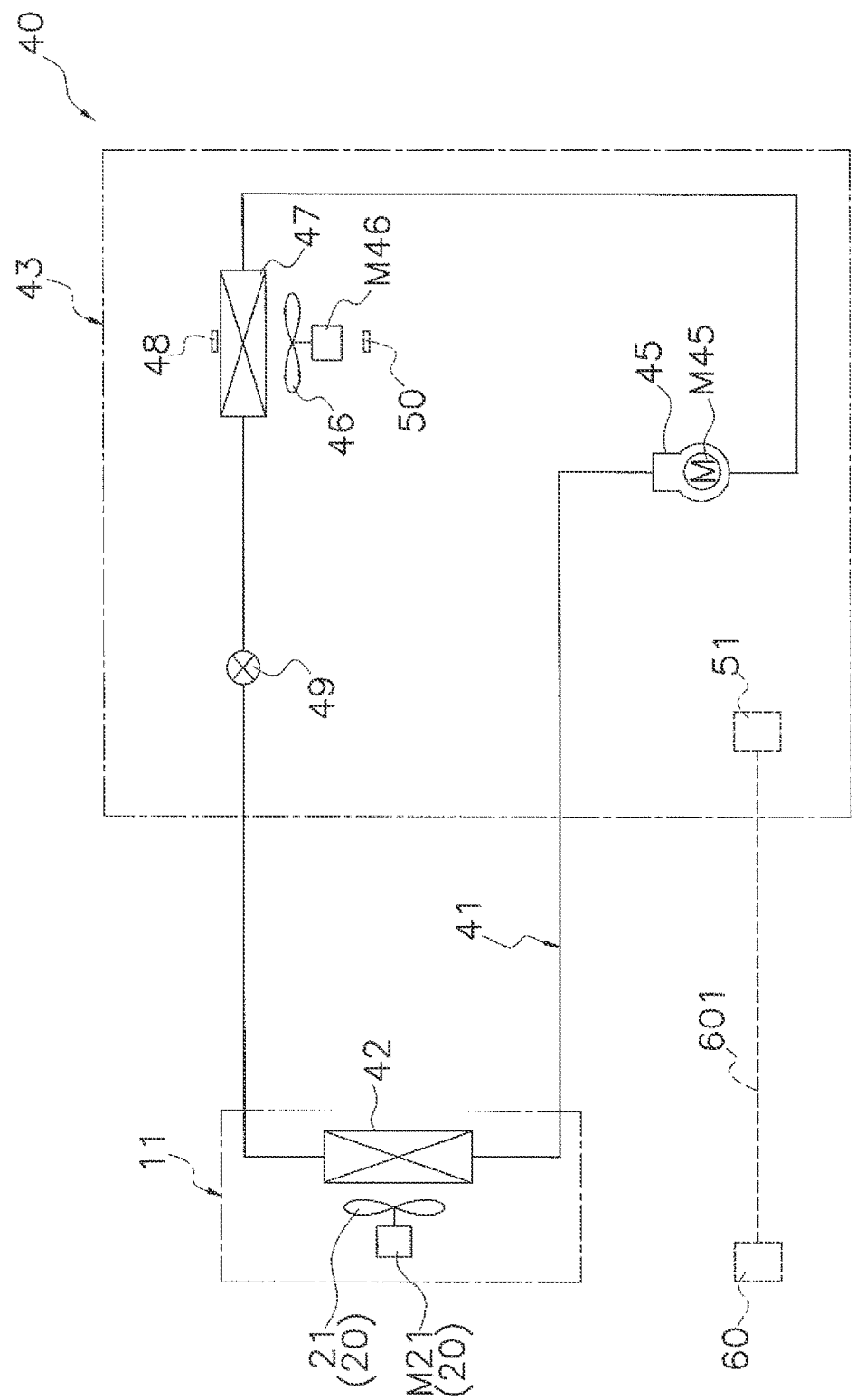
FIG. 4 is a refrigerant circuit diagram of the heat pump unit.

FIG. 4 is a refrigerant circuit diagram for the HP unit 40. The HP unit 40 has primarily a refrigerant pipe 41, the usage-side heat exchanger 42, and an outdoor unit 43, and a refrigerant circuit is configured in the HP unit 40 by connecting these components.

(2-5-1) Refrigerant Pipe 41

The refrigerant pipe 41 is made, e.g., of copper, and refrigerant flows through the interior. The refrigerant pipe 41 connects the usage-side heat exchanger 42 and the outdoor unit 43.

(2-5-2) Usage-Side Heat Exchanger 42

The usage-side heat exchanger 42 (equivalent to the "radiator" set forth in the claims) is, e.g., a cross-fin or micro-channel heat exchanger. The usage-side heat exchanger 42 includes a heat transfer tube (not shown) through which refrigerant flows. The refrigerant pipe 41 is connected to both the inflow port and outflow port of the heat transfer tube. The usage-side heat exchanger 42 is placed inside the main body casing 11 so as to be positioned above the fan unit 20 and the heat exchange section 31 of the GF unit 30. In other words, the usage-side heat exchanger 42 is positioned farther downstream along the air flow AF1 than the fan unit 20 and the heat exchange section 31 of the GF unit 30. The usage-side heat exchanger 42 arranged in this manner is configured so that in a state in which the HP unit 40 is operating as the heat source unit, when the air flow AF1 passes through the usage-side heat exchanger 42, heat is exchanged between the air flow AF1 and the refrigerant flowing through the heat transfer tube. When the HP unit 40 operates as the heat source unit, the usage-side heat exchanger 42 functions as a refrigerant condenser or radiator.

(2-5-3) Outdoor Unit 43

The outdoor unit 43 is installed on the outside. The outdoor unit 43 has, in the interior, primarily a compressor 45, an outdoor fan 46, an outdoor heat exchanger 47, a refrigerant temperature sensor 48, an expansion valve 49, an outdoor air temperature sensor 50, and an outdoor unit control part 51.

The compressor 45 is a mechanism for taking in low-pressure gas refrigerant, compressing the refrigerant, and discharging it as high-pressure gas refrigerant. The compressor 45 is a positive displacement compressor such as, e.g., a rotary or scroll compressor. Moreover, the compressor 45 is, e.g., a sealed type electric compressor in which a compressor motor M45 as a drive source is accommodated inside a casing (not shown). The compressor motor M45 is, e.g., a three-phase brushless DC motor. The rotational speed of the compressor motor M45 is adjusted as appropriate by the outdoor unit control part 51. The operating capacity of the HP unit 40 is thereby variably controlled.

The outdoor fan 46 is a blower such as, e.g., a propeller fan. The outdoor fan 46 is connected to a rotating shaft of an outdoor fan motor M46. The outdoor fan motor M46 is connected via a cable (not shown) to an outdoor fan power supply part (not shown) included in the outdoor unit control part 51, described hereinafter, and is supplied with power. When the outdoor fan motor M46 is energized and driven, the outdoor fan 46 is rotated, generating an air flow which flows into the outdoor unit 43 from the exterior and passes through the outdoor heat exchanger 47.

The outdoor heat exchanger 47 is, e.g., a cross-fin or micro-channel heat exchanger. The outdoor heat exchanger 47 includes a heat transfer tube (not shown) through which refrigerant flows. The refrigerant pipe 41 is connected to both the inflow port and outflow port of the heat transfer tube. The outdoor heat exchanger 47 is configured so that when the air flow generated by the outdoor fan 46 passes through, heat exchange takes place between the air flow and the refrigerant flowing through the heat transfer tube. When the HP unit 40 operates as the heat source unit, the outdoor heat exchanger 47 functions as a refrigerant evaporator The refrigerant temperature sensor 48 is a sensor such as, e.g., a thermocouple or a thermistor. The refrigerant temperature sensor 48 detects the temperature of refrigerant flowing inside the outdoor heat exchanger 47. The refrigerant temperature sensor 48, which is connected to the outdoor unit control part 51 via a cable (not shown), outputs an analog signal of the detected value.

The expansion valve 49 is configured from, e.g., an electric valve. The expansion valve 49 is positioned between the usage-side heat exchanger 42 and the outdoor heat exchanger 47. The expansion valve 49 depressurizes high-pressure liquid refrigerant that has condensed in the usage-side heat exchanger 42. The expansion valve 49 is connected (not shown) with the outdoor unit control part 51 via a cable, and the opening degree is adjusted as appropriate by the outdoor unit control part 51.

The outdoor air temperature sensor 50 (equivalent to the "second temperature sensor" set forth in the claims) is a sensor such as, e.g., a thermocouple or a thermistor. In the present embodiment, the outdoor air temperature sensor 50 is installed in the outdoor unit 43. The outdoor air temperature sensor 50 detects the temperature of outdoor air as an outdoor air temperature To. The outdoor air temperature sensor 50 is connected to the outdoor unit control part 51 via a cable (not shown), and outputs an analog signal of the detected value. The outdoor air temperature sensor 50 need not be placed inside the outdoor unit 43, and may be installed, e.g., on an outer wall, etc., of the house 100.

The outdoor unit control part 51 is a microcomputer including a CPU, memory, and/or the like. The outdoor unit control part 51 includes an inverter (not shown) for adjusting the rotational speed of the compressor motor M45. The outdoor unit control part 51 includes the outdoor fan power supply part for supplying power to the outdoor fan motor M46. The outdoor unit control part 51, which is connected to a controller 60 (described hereinafter) via a cable 601, conducts the sending and receiving of signals. Specifically, the outdoor unit control part 51 receives a command from the controller 60 and causes the inverter and the outdoor fan power supply part to function. The compressor motor M45 is thereby driven at the designated rotational speed, and the outdoor fan motor M46 is driven. The outdoor unit control part 51 receives the analog signal outputted from the outdoor air temperature sensor 50, and converts the signal from analog to digital to create outdoor air temperature information. The outdoor unit control part 51 sends the created outdoor air temperature information as appropriate to the controller 60.

(2-6) Electrical Component Unit 52

The electrical component unit 52 is a unit including various electric components. The electrical component unit 52 is installed on a side wall in the room 102. The electrical component unit 52 includes primarily a room temperature sensor 53, an input part 54, a display part 55, and the controller 60.

(2-6-1) Room Temperature Sensor 53

The room temperature sensor 53 (equivalent to the "first temperature sensor" set forth in the claims) includes a sensor such as, e.g., a thermocouple or a thermistor. The room temperature sensor 53 detects the temperature within the room 102. Specifically, the room temperature sensor 53 detects an indoor temperature Ti (described hereinafter). The room temperature sensor 53 includes an interface (not shown) having a communication function and an A/D conversion function. The room temperature sensor 53 is connected to the controller 60 via the cable 601 (see FIG. 5). The room temperature sensor 53 sends a digital signal, which is the detected value converted from analog to digital, to the controller 60. The room temperature sensor 53 is placed inside the room 102 in the present embodiment, but does not necessarily need to be placed inside the room 102; the sensor 53 may be installed in a room other than the room 102 of the house 100.

(2-6-2) Input Part 54

The input part 54 is configured from, e.g., input keys, a touch panel, and/or the like (not shown). Commands are inputted to the input part 54 by a user. For example, a user inputs commands such as initiating operation, stopping operation, selecting a set temperature and the like via the input part 54. The input part 54 is connected to the controller 60 via the cable 601 (see FIG. 5). The input part 54 sends a command signal corresponding to the inputted command to the controller 60.

(2-6-3) Display Part 55

The display part 55 includes e.g., an LED light, a liquid crystal panel, and/or the like (not shown). The display part 55, which is connected to the controller 60 via the cable 601 (see FIG. 5), receives display data signals from the controller 60. The display part 55 displays the circumstances under which the air-warming system 10 has been actuated (whether or not the system is operating, the set temperature, etc.), the room temperature, and/or the like on the basis of the received display data signals.

(2-6-4) Controller 60

The controller 60 is a microcomputer including RAM, ROM, a CPU, and the like. The controller 60 conducts the sending and receiving of signals with, or controls the actions of, the components connected via the cables 601. Specifically, the controller 60 controls the actions of units such as the fan unit 20, the GF unit 30, and the HP unit 40. The details of the controller 60 are described in the section "(3) Details of the controller 60" below.

(3) Details of the Controller 60

Figure 5:
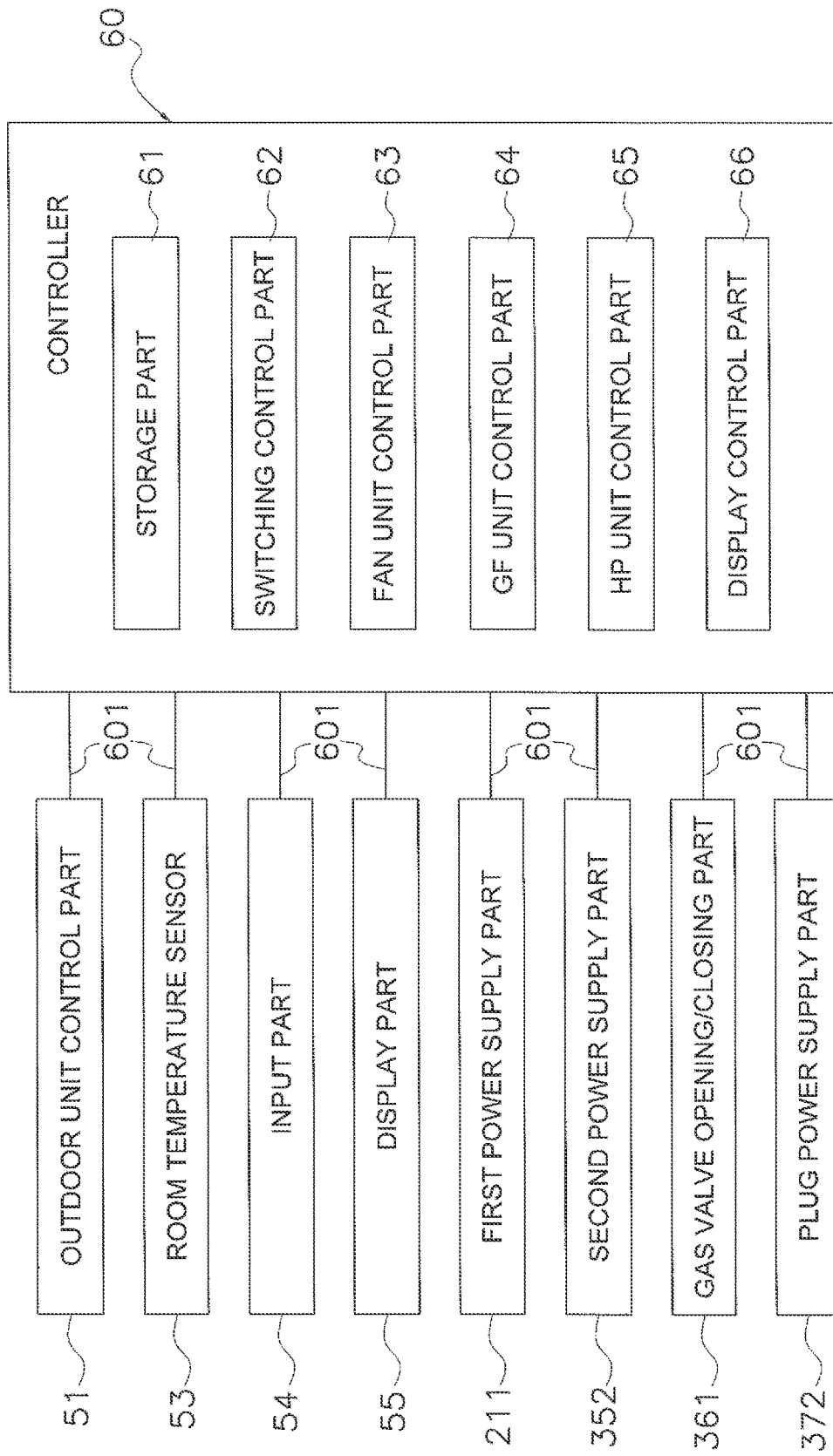
FIG. 5 is a schematic diagram showing the configuration of the controller and the devices connected to the controller.

FIG. 5 is a schematic diagram showing the general configuration of the controller 60 and the devices connected to the controller 60. The controller 60 is connected via the cables 601 primarily with the outdoor unit control part 51, the room temperature sensor 53, the input part 54, the display part 55, the first power supply part 211, the second power supply part 352, the gas valve opening/closing part 361, and the plug power supply part 372.

The controller 60 includes primarily a storage part 61, a switching control part 62, a fan unit control part 63, a gas furnace unit control part (written below as a GF unit control part) 64, a heat pump unit control part (written below as an HP unit control part) 65, and a display control part 66. These are described below.

(3-1) Storage Part 61

The storage part 61 retains control programs executed in the switching control part 62, the fan unit control part 63, the GF unit control part 64, the HP unit control part 65, and the display control part 66. The storage part 61 retains a digital signal, which is sent from the room temperature sensor 53 each elapse of a predetermined time period, as an indoor temperature (written below as room temperature) Ti. The storage part 61 receives outdoor air temperature information sent from the outdoor unit control part 51 at each elapse of a predetermined time period, and retains the information as the outdoor air temperature To. The storage part 61 deciphers command signals sent from the input part 54, and extracts and retains operation initiation commands, operation shutdown commands, set temperatures Tp, and the like.

(3-2) Switching Control Part 62

Figure 6:
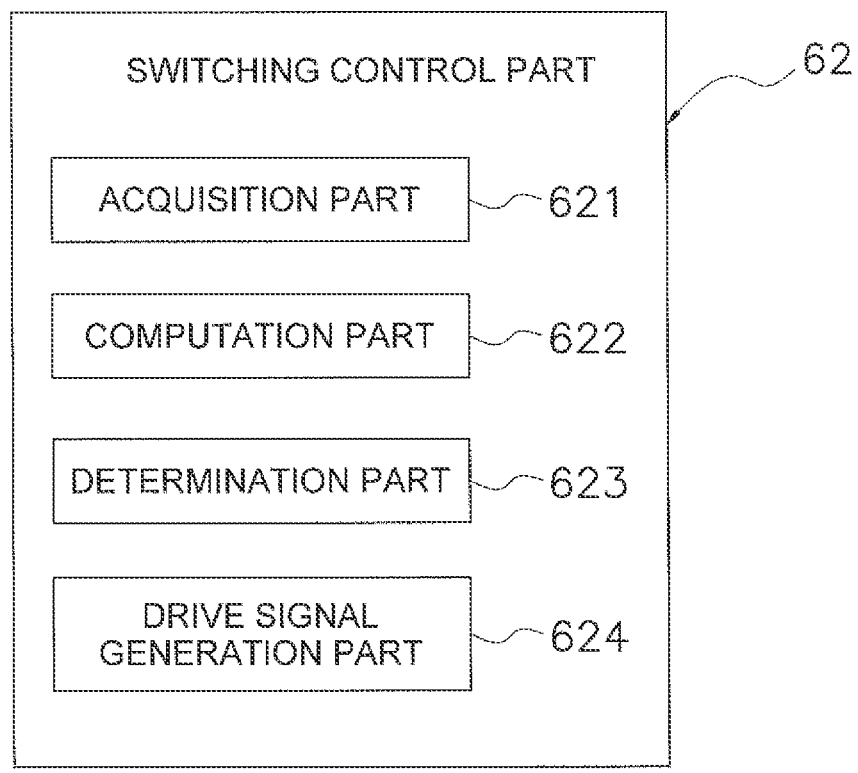
FIG. 6 is a schematic diagram showing the configuration of the switching control part.

FIG. 6 is a schematic diagram showing the configuration of the switching control part 62. The switching control part 62 performs control pertaining to selecting or switching the heat source unit of the air-warming system 10. The details of the selection or switching of the heat source unit by the switching control part 62 are described in the forthcoming section "(4) Flow of the process of the switching control part 62." The switching control part 62 has primarily an acquisition part 621, a computation part 622, a determination part 623, and a drive signal generation part 624.

(3-2-1) Acquisition Part 621

When power is turned on, the acquisition part 621 first acquires a control program from the storage part 61. The acquisition part 621 then acquires a user command from the storage part 61 in accordance with the control program. Specifically, when an operation initiation command or shutdown command is stored in the storage part 61, the acquisition part 621 acquires the operation initiation command or shutdown command in real time.

The acquisition part 621 then acquires the outdoor air temperature To, a room temperature Ti, and the set temperature Tp from the storage part 61 at a predetermined timing in accordance with the control program. Specifically, the acquisition part 621 acquires the outdoor air temperature To, the room temperature Ti, and the set temperature Tp when the operation initiation command has been acquired. The acquisition part 621 also acquires the outdoor air temperature To, the room temperature Ti, and the set temperature Tp when each predetermined time elapses while the air-warming system 10 is running. The predetermined time is set in the control program, and is set to a time of two seconds in the present embodiment. The acquisition part 621 outputs the acquired room temperature Ti and set temperature Tp to the computation part 622. The acquisition part 621 also outputs the acquired outdoor air temperature To to the determination part 623.

(3-2-2) Computation Part 622

When the room temperature Ti and set temperature Tp outputted from the acquisition part 621 are received, the computation part 622 calculates a difference value Dv1 which is a value obtained by subtracting the room temperature Ti from the set temperature Tp, in accordance with the control program. The computation part 622 outputs the calculated difference value Dv1 to the determination part 623.

(3-2-3) Determination Part 623

When the determination part 623 receives the outdoor air temperature To outputted from the acquisition part 621, the determination part 623 performs an outdoor air temperature assessment which is an assessment as to whether the outdoor air temperature To is equal to or greater than a predetermined standard value Sv1. The standard value Sv1 is set in advance in the control program as a value of the outdoor air temperature To satisfying a condition that operation of the GF unit 30 as the heat source unit is more energy efficient than operation of the HP unit 40 as the heat source unit when the outdoor air temperature To is less than the standard value Sv1. In the present embodiment, the standard value Sv1 is set to 0 (° C.). When the result of the outdoor air temperature assessment indicates that the outdoor air temperature To is equal to or greater than the standard value Sv1, the determination part 623 outputs an assessment signal indicating the high outdoor air temperature to the drive signal generation part 624. When the outdoor air temperature To is less than the standard value Sv1, the determination part 623 outputs an assessment signal indicating the low outdoor air temperature to the drive signal generation part 624.

When the determination part 623 receives the difference value Dv1 outputted from the computation part 622, the determination part 623 performs a room temperature assessment for assessing whether the difference value Dv1 is greater than zero (i.e., whether the room temperature Ti is less than the set temperature Tp). When the result of the room temperature assessment indicates that the difference value Dv1 is greater than zero (i.e., when the room temperature Ti is less than the set temperature Tp), the determination part 623 outputs an assessment signal indicating the low room temperature to the drive signal generation part 624. When the difference value Dv1 is equal to or less than zero (i.e., when the room temperature Ti is equal to or greater than the set temperature Tp), the determination part 623 outputs an assessment signal indicating the high room temperature to the drive signal generation part 624.

When the determination part 623 receives the difference value Dv1 outputted from the computation part 622, the determination part 623 performs, separately from the room temperature assessment, a difference value assessment which is an assessment as to whether the difference value Dv1 is less than a first threshold $\Delta Th1$, a second threshold $\Delta Th2$, or a third threshold $\Delta Th3$. More specifically, when neither the GF unit 30 nor the HP unit 40 is operating as a heat source unit, the determination part 623 assesses whether the difference value Dv1 is less than the first threshold $\Delta Th1$. When the GF unit 30 is operating as the heat source unit, the determination part 623 assesses whether the difference value Dv1 is less than the second threshold $\Delta Th2$. When the HP unit 40 is operating as the heat source unit, the determination part 623 assesses whether the difference value Dv1 is less than the third threshold $\Delta Th3$.

When the result of the difference value assessment indicates that the difference value Dv1 is equal to or greater than the first threshold $\Delta Th1$, the second threshold $\Delta Th2$, or the third threshold $\Delta Th3$, the determination part 623 outputs an assessment signal indicating the large difference value to the drive signal generation part 624. When the difference value Dv1 is less than the first threshold $\Delta Th1$, the second threshold $\Delta Th2$, or the third threshold $\Delta Th3$, the determination part 623 outputs an assessment signal indicating the small difference value to the drive signal generation part 624.

The first threshold $\Delta Th1$, second threshold $\Delta Th2$, and third threshold $\Delta Th3$ are set in advance in the control program as values whereby the room temperature Ti can be brought close to the set temperature Tp in less time by causing the GF unit 30 to operate as the heat source unit than by causing the HP unit 40 to operate as the heat source unit when the difference value Dv1 is equal to or greater than the thresholds. Also, the first threshold $\Delta Th1$, second threshold $\Delta Th2$, and third threshold $\Delta Th3$ are set in advance in the control program as values whereby the room temperature Ti is more easily maintained near the set temperature Tp by causing the HP unit 40 to operate as the heat source unit than by causing the GF unit 30 to operate as the heat source unit when the difference value Dv1 is less than the thresholds. In the present embodiment, the first threshold $\Delta Th1$, the second threshold $\Delta Th2$, and the third threshold $\Delta Th3$ are each set to 5 (° C.).

(3-2-4) Drive Signal Generation Part 624

The drive signal generation part 624 generates signals of various kinds in accordance with the control program and outputs the signals to other parts. Specifically, when the drive signal generation part 624 receives the assessment signal indicating the high room temperature from the determination part 623, the drive signal generation part 624 generates and outputs a suspension signal to the fan unit control part 63, the GF unit control part 64, the HP unit control part 65, and the display control part 66.

When the drive signal generation part 624 receives the assessment signal indicating the low room temperature from the determination part 623, the drive signal generation part 624 generates and outputs signals of various kinds in accordance with a table tb1 programmed into the control program. FIG. 7 is a conceptual diagram of the table tb1. The processing performed by the drive signal generation part 624 when the assessment signal indicating the low room temperature is received from the determination part 623 is described below with reference to FIG. 7.

When the drive signal generation part 624 receives the assessment signal indicating the large difference value in a state in which the assessment signal indicating the low outdoor air temperature has been received from the determination part 623, the drive signal generation part 624 generates and outputs a gas furnace unit drive signal (referred to hereinafter as a GF unit drive signal) to the GF unit control part 64, and generates and outputs a heat pump unit stop signal (referred to hereinafter as an HP unit stop signal) to the HP unit control part 65 (cl1 in tb1).

When the drive signal generation part 624 receives the assessment signal indicating the small difference value in a state in which the assessment signal indicating the low outdoor air temperature has been received from the determination part 623, the drive signal generation part 624 generates and outputs the GF unit drive signal to the GF unit control part 64, and generates and outputs the HP unit stop signal to the HP unit control part 65 (cl2 in tb1), the same as in cl1.

When the drive signal generation part 624 receives the assessment signal indicating the large difference value in a state in which the assessment signal indicating the high outdoor air temperature has been received from the determination part 623, the drive signal generation part 624 generates and outputs the GF unit drive signal to the GF unit control part 64, and generates and outputs the HP unit stop signal to the HP unit control part 65 (cl3 in tb1), the same as in cl1 and cl2.

When the drive signal generation part 624 receives the assessment signal indicating the small difference value in a state in which the assessment signal indicating the high outdoor air temperature has been received from the determination part 623, the drive signal generation part 624 generates and outputs a gas furnace unit stop signal (referred to hereinafter as a GF unit stop signal) to the GF unit control part 64, and generates and outputs a heat pump unit drive signal (referred to hereinafter as an HP unit drive signal) to the HP unit control part 65 (cl4 in tb1).

In summary, when the assessment signal indicating the low room temperature has been received from the determination part 623, the drive signal generation part 624 generates the GF unit stop signal and the HP unit drive signal to cause the HP unit 40 to operate as the heat source unit rather than the GF unit 30 only when the assessment signal indicating the high outdoor air temperature is received and the assessment signal indicating the small difference value is received. At all other times, the drive signal generation part 624 generates the GF unit drive signal and the HP unit stop signal to cause the GF unit 30 to operate as the heat source unit rather than the HP unit 40.

(3-3) Fan Unit Control Part 63

When power is turned on, the fan unit control part 63 first acquires the control program from the storage part 61. The fan unit control part 63 then acquires a user command from the storage part 61 in accordance with the control program. Specifically, when the operation initiation command or shutdown command is stored in the storage part 61, the fan unit control part 63 acquires the operation initiation command or shutdown command in real time.

When the operation initiation command is acquired, the fan unit control part 63 sends a signal to the first power supply part 211 so as to initiate supplying power to the first fan motor M21. The first fan motor M21 thereby starts driving, and the fan unit 20 goes into an operating state. When a shutdown command is acquired, the fan unit control part 63 sends a signal to the first power supply part 211 so as to stop the power supply to the first fan motor M21. The first fan motor M21 thereby stops driving, and operation of the fan unit 20 is stopped.

When the fan unit control part 63 receives the suspension signal outputted from the drive signal generation part 624, the fan unit control part 63 sends a signal to the first power supply part 211 so as to cause the supply of the power to the first fan motor M21 is suspend. Driving of the first fan motor M21 is thereby suspended, and the fan unit 20 is placed in a suspended state in which operation thereof is suspended. When the suspension signal is received while the fan unit 20 is already in the suspended state, the fan unit control part 63 does not do any action according to the suspension signal.

(3-4) GF Unit Control Part 64

When power is turned on, the GF unit control part 64 acquires the control program from the storage part 61. The GF unit control part 64 generates a signal according to the control program and sends the generated signal to other parts.

Specifically, when the GF unit control part 64 receives the GF unit drive signal outputted from the drive signal generation part 624, the GF unit control part 64 sends a signal to the second power supply part 352 so as to initiate supplying power to the second fan motor 351. In addition, the GF unit control part 64 sends a signal to the gas valve opening/closing part 361 so as to cause the gas valve 36 to open. The GF unit control part 64 subsequently sends a signal to the plug power supply part 372 so as to cause electric discharge in the plug 371 for a predetermined time. Driving of the second fan motor 351 is thereby started and the fan 35 is placed in an active state, the combustion gas is generated in the combustion part 37, and the GF unit 30 goes into a state of operating as the heat source unit. When the GF unit drive signal is received while the GF unit 30 is already operating as the heat source unit, the GF unit control part 64 does not do any action according to the GF unit drive signal.

When the GF unit control part 64 receives the GF unit stop signal outputted from the drive signal generation part 624, the GF unit control part 64 sends a signal to the gas valve opening/closing part 361 so as to cause the gas valve 36 to close. The GF unit control part 64 subsequently sends a signal to the second power supply part 352 so as to stop the power supply to the second fan motor 351. Driving of the second fan motor 351 is thereby stopped, the fan 35 is placed in a stopped state, generation of the combustion gas in the combustion part 37 is stopped, and operation of the GF unit 30 as the heat source unit is stopped. When the GF unit stop signal is received while the GF unit 30 has stopped operating as the heat source unit, the GF unit control part 64 does not do any action according to the GF unit stop signal.

When the GF unit control part 64 receives the suspension signal outputted from the drive signal generation part 624, the GF unit control part 64 sends a signal to the gas valve opening/closing part 361 so as to cause the gas valve 36 to close. The GF unit control part 64 subsequently sends a signal to the second power supply part 352 so as to cause the supply of the power to the second fan motor 351 to be suspended. Driving of the second fan motor 351 is thereby suspended, the fan 35 is placed in a suspended state, generation of the combustion gas in the combustion part 37 is suspended, and the GF unit 30 is placed in a suspended state in which operation thereof as the heat source unit is suspended. When the suspension signal is received while the GF unit 30 is already in the suspended state, the GF unit control part 64 does not do any action according to the suspension signal.

(3-5) HP Unit Control Part 65

When power is turned on, the HP unit control part 65 acquires the control program from the storage part 61. The HP unit control part 65 generates signals in accordance with the control program and sends the signals to other parts.

Specifically, when the HP unit control part 65 receives the HP unit drive signal outputted from the drive signal generation part 624, the HP unit control part 65 sends a signal to the outdoor unit control part 51 so as to initiate supplying power to the compressor motor M45 and the outdoor fan motor M46. The HP unit control part 65 also sends a signal to the outdoor unit control part 51 so as to cause the expansion valve 49 to open at an appropriate opening degree. A vapor compression refrigerating cycle thereby is taken place in the HP unit 40, and the HP unit 40 is placed in a state of operating as the heat source unit. When the HP unit 40 is already operating as the heat source unit and the HP unit drive signal is received, the HP unit control part 65 does not do any action according to the HP unit drive signal.

When the HP unit control part 65 receives the HP unit stop signal outputted from the drive signal generation part 624, the HP unit control part 65 sends a signal to the outdoor unit control part 51 so as to stop the power supply to the compressor motor M45 and the outdoor fan motor M46. In addition, the HP unit control part 65 sends a signal to the outdoor unit control part 51 so as to cause the expansion valve 49 to open. The HP unit 40 is thereby placed in a state in which operation thereof as the heat source unit is stopped. When the HP unit 40 has stopped operating and the HP unit stop signal is received, the HP unit control part 65 does not do any action according to the HP unit stop signal.

When the HP unit control part 65 receives the suspension signal outputted from the drive signal generation part 624, the HP unit control part 65 sends a signal to the outdoor unit control part 51 so as to cause the supply of electric power to the compressor motor M45 and the outdoor fan motor M46 to be suspended. The HP unit 40 is thereby placed in a suspended state in which operation thereof as the heat source unit is suspended. When the suspension signal is received while the HP unit 40 is already in the suspended state, the HP unit control part 65 does not do any action according to the suspension signal.

(3-6) Display Control Part 66

When power is turned on, the display control part 66 acquires the control program from the storage part 61. The display control part 66 then acquires the user command, the room temperature Ti, the set temperature Tp, etc. from the storage part 61 in accordance with the control program. Specifically, the display control part 66 acquires the operation initiation command or shutdown command, the room temperature Ti, and the set temperature Tp in real time when these information are stored in the storage part 61.

When the operation initiation command is acquired, the display control part 66 sends display data showing information such as a state of operation, the current room temperature Ti, the set temperature Tp, and the like to the display part 55. The display part 55 thereby shows a display informing the user of information such as that the air-warming system 10 is running, the current room temperature Ti, the set temperature Tp, and the like. The display control part 66 also sends a signal for stopping the display to the display part 55 when the display control part 66 acquires a shutdown command. The display on the display part 55 thereby ceases.

When the display control part 66 receives the suspension signal outputted from the drive signal generation part 624, the display control part 66 sends display data showing information that the air-warming system 10 is in a standby state to the display part 55. A display to the user indicating that the air-warming system 10 is in the standby state is thereby performed in the display part 55. When the suspension signal is received while the air-warming system 10 is in the standby state is being displayed, The display control part 66 does not do any action according to the suspension signal.

(4) Flow of the Process of the Switching Control Part 62

Figure 8:
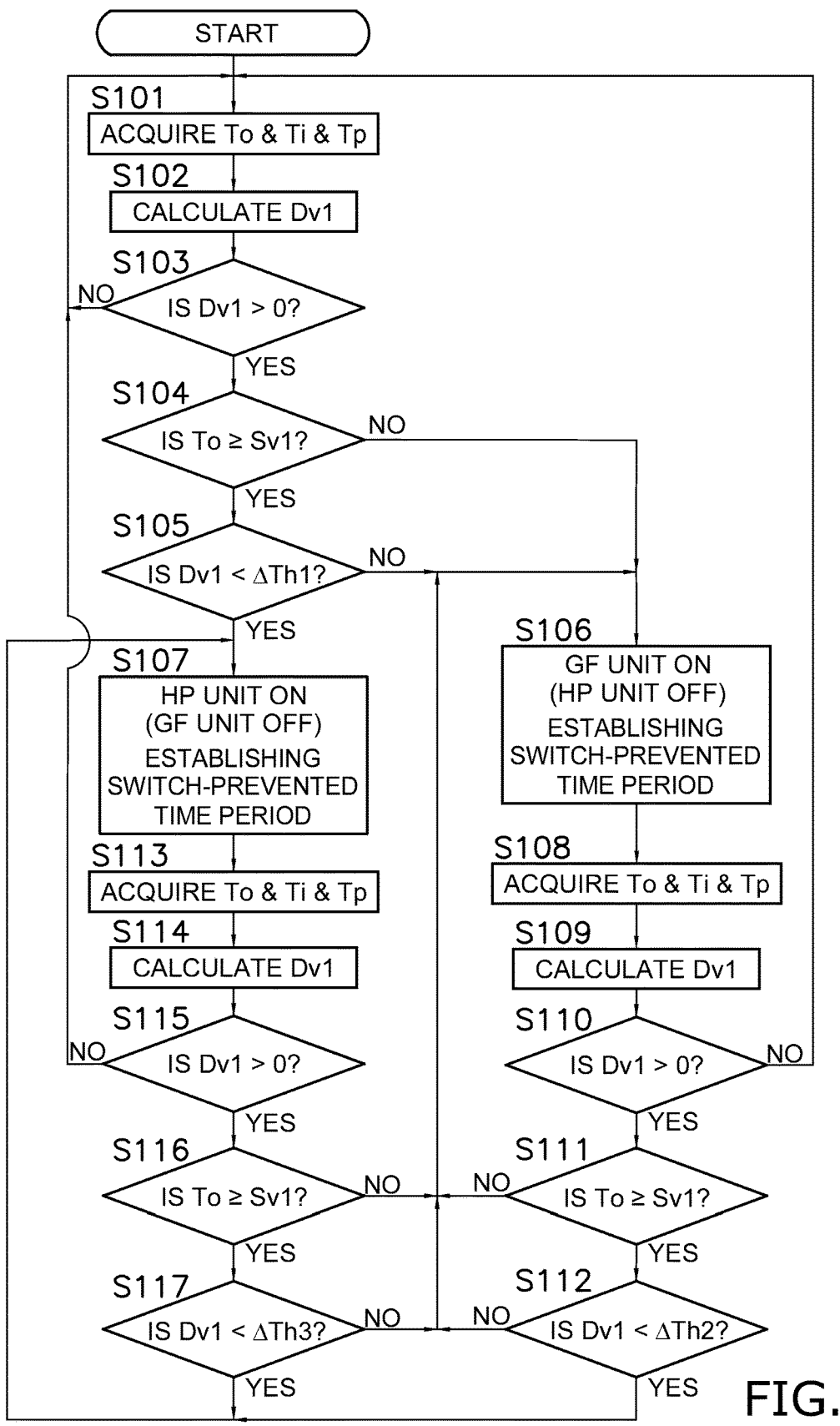
FIG. 8 is a flowchart showing the flow of the process of the switching control part.

An example of the flow of the process of the switching control part 62 is described below with reference to FIG. 8. FIG. 8 is a flowchart showing the flow of the process of the switching control part 62. The following description is of an example of the processing, and the switching control part 62 may execute processing according to a different flow than that which is described below. In the present embodiment, when power to the air-warming system 10 is turned on and the operation initiation command is inputted, the switching control part 62 performs the process having the flow shown in FIG. 8.

In step S101, the acquisition part 621 acquires the outdoor air temperature To, the room temperature Ti, and the set temperature Tp from the storage part 61. The acquisition part 621 outputs the acquired room temperature Ti and set temperature Tp to the computation part 622. The acquisition part 621 outputs the acquired outdoor air temperature To to the determination part 623. The process then proceeds to step S102.

In step S102, the computation part 622 receives the room temperature Ti and set temperature Tp outputted from the acquisition part 621, calculates the difference value Dv1 which is the value obtained by subtracting the room temperature Ti from the set temperature Tp. The computation part 622 outputs the calculated difference value Dv1 to the determination part 623. The process then proceeds to step S103.

In step S103, the determination part 623 receives the difference value Dv1 outputted from the computation part 622 and performs the room temperature assessment. When the result of the room temperature assessment is NO (i.e., when the difference value Dv1 is equal to or less than zero), the determination part 623 outputs the assessment signal indicating the high room temperature to the drive signal generation part 624. The drive signal generation part 624 receives the assessment signal indicating a high room temperature and outputs the suspension signal to the other part. The process then returns to step S101. When the result of the room temperature assessment is YES (i.e., when the difference value Dv1 is greater than zero), the determination part 623 outputs the assessment signal indicating the low room temperature to the drive signal generation part 624, and the process proceeds to step S104.

In step S104, the determination part 623 receives the outdoor air temperature To outputted from the acquisition part 621 and performs the outdoor air temperature assessment. When the result of the outdoor air assessment is NO (i.e., when the outdoor air temperature To is less than the standard value Sv1), the determination part 623 outputs the assessment signal indicating the low outdoor air temperature to the drive signal generation part 624. The process then proceeds to step S106. When the result of the outdoor air assessment is YES (i.e., when the outdoor air temperature To is equal to or greater than the standard value Sv1), the determination part 623 outputs the assessment signal indicating the high outdoor air temperature to the drive signal generation part 624. The process then proceeds to step S105.

In step S105, the determination part 623 receives the difference value Dv1 outputted from the computation part 622 and performs the difference value assessment, which is the assessment as to whether the difference value Dv1 is less than the first threshold $\Delta$Th1. When the result of the difference value assessment is NO (i.e., when the difference value Dv1 is equal to or greater than the first threshold $\Delta$Th1), the assessment signal indicating the large difference value is outputted to the drive signal generation part 624. The process then proceeds to step S106. When the result of the assessment is YES (i.e., when the difference value Dv1 is less than the first threshold $\Delta$Th1), the assessment signal indicating the small difference value is outputted to the drive signal generation part 624. The process then proceeds to step S107.

In step S106, the drive signal generation part 624 receives the signals outputted from the determination part 623, generates and outputs the GF unit drive signal to the GF unit control part 64, and generates and outputs the HP unit stop signal to the HP unit control part 65. The GF unit 30 rather than the HP unit 40 is thereby placed in a state of operating as the heat source unit. The process then proceeds to step S108.

In step S107, the drive signal generation part 624 receives the signals outputted from the determination part 623, generates and outputs the HP unit drive signal to the HP unit control part 65, and generates and outputs the GF unit stop signal to the GF unit control part 64. The HP unit 40 thereby operates as the heat source unit rather than the GF unit 30. The process then proceeds to step S113.

In step S108, the same processing as in step S101 is performed. The process then proceeds to step S109.

In step S109, the same processing as in step S102 is performed. The process then proceeds to step S110.

In step S110, the same processing as in step S103 is performed. When the result of the room temperature assessment in step S110 is NO (i.e., when the difference value Dv1 is equal to or less than zero), the determination part 623 outputs the assessment signal indicating the high room temperature to the drive signal generation part 624. The drive signal generation part 624 receives this signal and outputs the suspension signal to other parts. The process then returns to step S101. When the result of the assessment is YES (i.e., when the difference value Dv1 is greater than zero), the determination part 623 outputs the assessment signal indicating the low room temperature to the drive signal generation part 624, and the process proceeds to step S111.

In step S111, the same processing as in step S104 is performed. When the result of the outdoor air temperature assessment in step S111 is NO (i.e., when the outdoor air temperature To is less than the standard value Sv1), the determination part 623 outputs the assessment signal indicating the low outdoor air temperature to the drive signal generation part 624. The process then returns to step S106. When the result of the assessment is YES (i.e., when the outdoor air temperature To is equal to or greater than the standard value Sv1), the determination part 623 outputs the assessment signal indicating the high outdoor air temperature to the drive signal generation part 624. The process then proceeds to step S12.

In step S112, the determination part 623 receives the difference value Dv1 outputted from the computation part 622 and performs the difference value assessment, which is the assessment as to whether the difference value Dv1 is less than the second threshold ΔTh2. When the result of the difference value assessment is NO (i.e., when the difference value Dv1 is equal to or greater than the second threshold ΔTh2), the determination part 623 outputs the assessment signal indicating the large difference value to the drive signal generation part 624. The process then returns to step S106. When the result of the assessment is YES (i.e., when the difference value Dv1 is less than the second threshold ΔTh2), the determination part 623 outputs the assessment signal indicating the small difference value is outputted to the drive signal generation part 624. The process then returns to step S107.

In step S113, the same processing as in step S101 is performed. The process then proceeds to step S114.

In step S114, the same processing as in step S102 is performed. The process then proceeds to step S115.

In step S115, the same processing as in step S103 is performed. When the result of the room temperature assessment in step S115 is NO (i.e., when the difference value Dv1 is equal to or less than zero), the determination part 623 outputs the assessment signal indicating the high room temperature to the drive signal generation part 624. The drive signal generation part 624 receives this signal and outputs the suspension signal to other parts. The process then returns to step S101. When the result of the assessment is YES (i.e., when the difference value Dv1 is greater than zero), the determination part 623 outputs the assessment signal indicating the low room temperature to the drive signal generation part 624, and the process proceeds to step S116.

In step S116, the same processing as in step S104 is performed. When the result of the outdoor air temperature assessment in step S116 is NO (i.e., when the outdoor air 30 temperature To is less than the standard value Sv1), the determination part 623 outputs the assessment signal indicating the low outdoor air temperature to the drive signal generation part 624. The process then returns to step S106. When the result of the assessment is YES (i.e., when the outdoor air temperature To is equal to or greater than the standard value Sv1), the determination part 623 outputs the assessment signal indicating the high outdoor air temperature to the drive signal generation part 624. The process then proceeds to step S117.

In step S117, the determination part 623 receives the difference value Dv1 outputted from the computation part 622 and performs the difference value assessment, which is the assessment as to whether the difference value Dv1 is less than the third threshold ΔTh3. When the result of the difference value assessment is NO (i.e., when the difference value Dv1 is equal to or greater than the third threshold ΔTh3), the determination part 623 outputs the assessment signal indicating the large difference value to the drive signal generation part 624. The process then returns to step S106. When the result of the assessment is YES (i.e., when the difference value Dv1 is less than the third threshold ΔTh3), the determination part 623 outputs the assessment signal indicating the small difference value to the drive signal generation part 624. The process then returns to step S107.

(5) Action State of Each Unit

Figure 9:
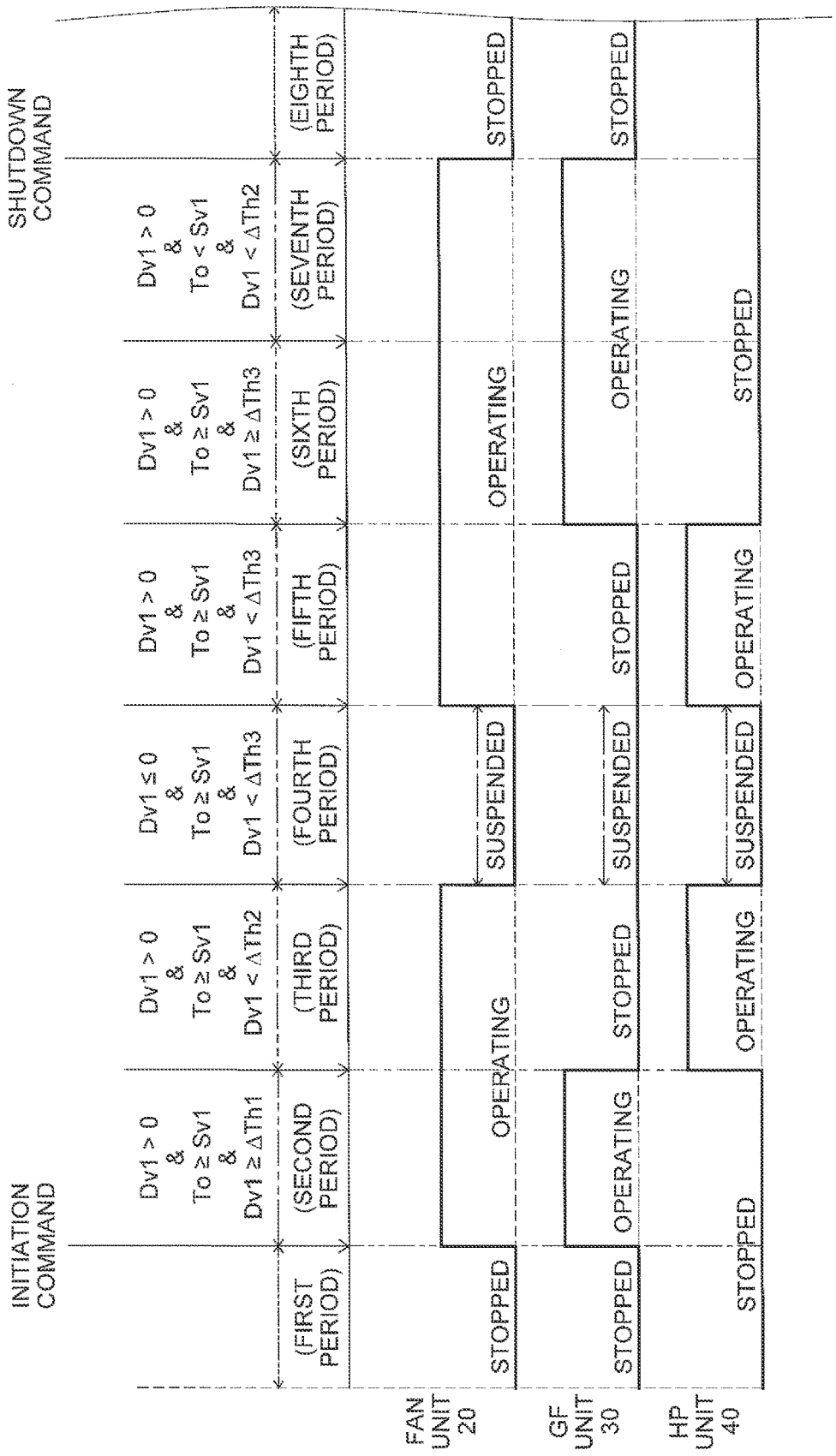
FIG. 9 is a timing chart showing an example of the changes in the state of each unit when an operation initiation command is inputted.

The action state of each unit of the air-warming system 10 is described below with reference to FIG. 9. FIG. 9 is a timing chart showing an example of the changes in the state of each unit when the operation initiation command is inputted.

In a first period, the air-warming system 10 is in a stopped state. Specifically, operation of the fan unit 20, the GF unit 30, and the HP unit 40 is stopped.

In a second period, the fan unit 20 operates in response to inputting of the operation initiation command. The GF unit 30 also operates as the heat source unit in response to the outdoor air temperature To being equal to or greater than the standard value Sv1 and the difference value Dv1 being equal to or greater than the first threshold ΔTh1. The HP unit 40 remains stopped. Specifically, upon the initiation of operation (startup) of the air-warming system 10, the controller 60 causes the HP unit 40 to operate as the heat source unit when the difference value Dv1 is less than the first threshold ΔTh1, and causes the GF unit 30 to operate as the heat source unit when the difference value Dv1 is equal to or greater than the first threshold ΔTh1.

In a third period, in response to the difference value Dv1 having become less than the second threshold ΔTh2, the GF unit 30 stops operating, and the HP unit 40 operates as the heat source unit. Specifically, when the GF unit 30 is operating as the heat source unit, the controller 60 causes the HP unit 40 to operate as the heat source unit instead of the GF unit 30 when the difference value Dv1 becomes less than the second threshold ΔTh2. The fan unit 20 remains operating.

In a fourth period, the air-warming system 10 enters the standby state in response to the difference value Dv1 having become equal to or less than zero. Specifically, operation of the fan unit 20, the GF unit 30, and the HP unit 40 is suspended.

In a fifth period, the standby state of the air-warming system 10 is canceled in response to the difference value Dv1 having become greater than zero. The fan unit 20 and the HP unit 40 thereby resume operating. Operation of the GF unit 30 is stopped.

In a sixth period, in response to the difference value Dv1 having become equal to or greater than the third threshold ΔTh3, the HP unit 40 stops operating and the GF unit 30 operates as the heat source unit. The fan unit 20 remains operating.

In a seventh period, although the difference value Dv1 has become less than the second threshold ΔTh2, the GF unit 30 remains operating as the heat source unit and operation of the HP unit 40 remains stopped in response to the outdoor air temperature To having become less than the standard value Sv1. The fan unit 20 remains operating.

In an eighth period, the air-warming system 10 stops in response to inputting of the shutdown command. Specifically, operation of the fan unit 20, the GF unit 30, and the HP unit 40 is stopped.

Figure 10:
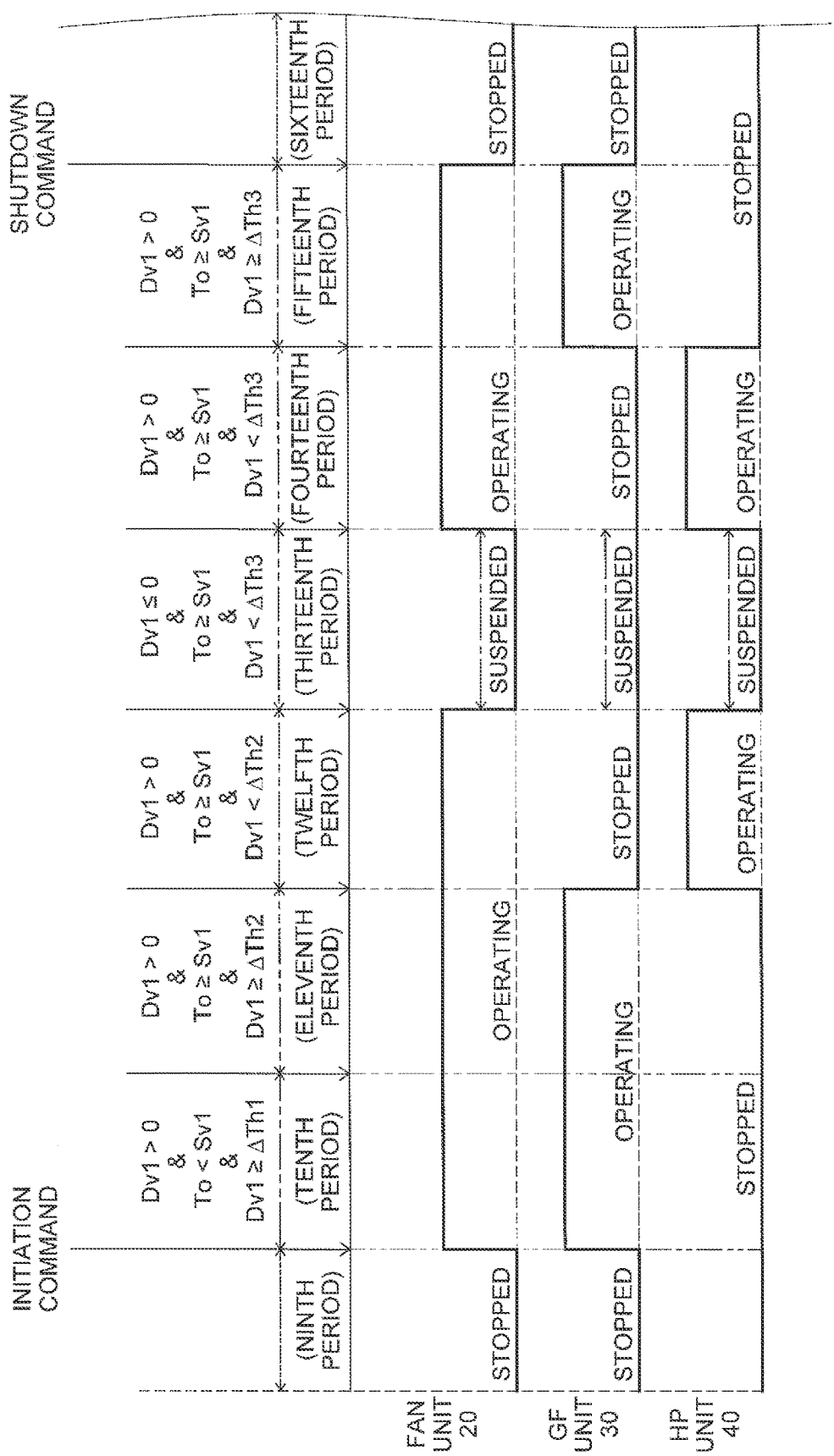
FIG. 10 is a timing chart showing an example of the changes in the state of each unit when an operation initiation command is inputted.

Next, the action state of each unit of the air-warming system 10 is described with reference to FIG. 10. FIG. 10 is a timing chart showing an example of the changes in the state of each unit when the operation initiation command is inputted.

In a ninth period, the air-warming system 10 is in a stopped state. Specifically, operation of the fan unit 20, the GF unit 30, and the HP unit 40 is stopped.

In a tenth period, the fan unit 20 operates in response to inputting of the operation initiation command. The GF unit 30 also operates as the heat source unit in response to the outdoor air temperature To being less than the standard value Sv1. Specifically, when the outdoor air temperature To is less than the standard value Sv1 upon the initiation of operation (startup) of the air-warming system 10, the controller 60 causes the GF unit 30 to operate as the heat source unit rather than causing the HP unit 40 to operate as the heat source unit.

In an eleventh period, although the outdoor air temperature To has become equal to or greater than the standard value Sv1, the GF unit 30 remains operating as the heat source unit in response to the difference value Dv1 being equal to or greater than the second threshold ΔTh2. The fan unit 20 remains operating. The HP unit 40 also remains stopped.

In a twelfth period, in response to the difference value Dv1 having become less than the second threshold ΔTh2, operation of the GF unit 30 is stopped, and the HP unit 40 operates as the heat source unit. The fan unit 20 remains operating.

In a thirteenth period, the air-warming system 10 enters the standby state in response to the difference value Dv1 having become equal to or less than zero. Specifically, operation of the fan unit 20, the GF unit 30, and the HP unit 40 is suspended.

In a fourteenth period, the standby state of the air-warming system 10 is canceled in response to the difference value Dv1 having become greater than zero. The fan unit 20 thereby resumes operating. The HP unit 40 also resumes operating as the heat source unit. Operation of the GF unit 30 is stopped.

In a fifteenth period, in response to the difference value Dv1 having become equal to or greater than the third threshold ΔTh3, operation of the HP unit 40 is stopped and the GF unit 30 operates as the heat source unit. Specifically, when the HP unit 40 is operating as the heat source unit, the controller 60 causes the GF unit 30 to operate as the heat source unit instead of the HP unit 40 when the difference value Dv1 becomes equal to or greater than the third threshold ΔTh3. The fan unit 20 remains operating.

In a sixteenth period, the air-warming system 10 stops in response to inputting of a shutdown command. Specifically, operation of the fan unit 20, the GF unit 30, and the HP unit 40 is stopped.

(6) Features (6-1)

In the embodiment described above, upon initiation of operation of the air-warming system 10, the controller 60 causes the GF unit 30 to operate as the heat source unit when the difference value Dv1 obtained by subtracting the room temperature Ti from the set temperature Tp is equal to or greater than the first threshold ΔTh1, and causes the HP unit 40 to operate as the heat source unit when the difference value Dv1 is less than the first threshold ΔTh1. When the difference value Dv1 is equal to or greater than the first threshold ΔTh1, the room temperature Ti can be brought closer to the set temperature Tp in less time by causing the GF unit 30 to operate as the heat source unit than by causing the HP unit 40 to operate as the heat source unit, and amenity is therefore enhanced. When the difference value Dv1 is less than the first threshold ΔTh1, the room temperature Ti is more easily maintained near the set temperature Tp by causing the HP unit 40 to operate as the heat source unit than by causing the GF unit 30 to operate as the heat source unit, and amenity is therefore enhanced. The air-warming system 10 is therefore configured so that the GF unit 30 or the HP unit 40, whichever is more capable of air conditioning having excellent amenity, is operated as the heat source unit upon initiation of operation (startup) of the air-warming system 10. The air-warming system 10 is thereby configured so that air conditioning having excellent amenity is realized.

(6-2)

In the embodiment described above, when the difference value Dv1 becomes less than the second threshold ΔTh2 while the GF unit 30 is operating as the heat source unit, the controller 60 causes the HP unit 40 to operate as the heat source unit instead of the GF unit 30. The operating heat source unit is thereby switched from the GF unit 30 to the HP unit 40 when the difference value Dv1 becomes less than the second threshold ΔTh2 (i.e., when the room temperature Ti has reached a temperature near the set temperature Tp) while the GF unit 30 is operating as the heat source unit. The air-warming system 10 is thus configured so that the room temperature Ti is easily maintained near the set temperature Tp.

(6-3)

In the embodiment described above, the controller 60 causes the GF unit 30 to operate as the heat source unit instead of the HP unit 40 when the difference value Dv1 becomes equal to or greater than the third threshold ΔTh3 while the HP unit 40 is operating as the heat source unit. The operating heat source unit is thereby switched from the HP unit 40 to the GF unit 30 when the difference value Dv1 becomes equal to or greater than the third threshold ΔTh3 (i.e., when the difference between the room temperature Ti and the set temperature Tp becomes large) while the HP unit 40 is operating as the heat source unit. The air-warming system 10 is thus configured so that the room temperature Ti can easily approach the set temperature Tp even when the difference between the room temperature Ti and the set temperature Tp becomes large while the air-warming system 10 is running.

(6-4)

In the embodiment described above, when the outdoor air temperature To is less than the standard value Sv1 at the initiation time of operation of the air-warming system 10, the controller 60 causes the GF unit 30 to operate as the heat source unit regardless of the difference value Dv1. In conditions where the outdoor air temperature To is below the standard value Sv1, operation of the GF unit 30 as the heat source unit is more energy efficient than operation of the HP unit 40 as the heat source unit. The air-warming system 10 is therefore configured so that air conditioning having excellent energy efficiency is realized at the initiation time of operation thereof.

(7) Modifications (7-1) Modification A

The air-warming system 10 is employed as the air conditioning system in the embodiment described above, but the air conditioning system is not limited to this configuration. For example, the air-warming system 10 may be configured as an air conditioning system that is capable of air-cooling operation separate from air-warming operation, by providing a four-way switching valve in the outdoor unit 43 of the HP unit 40. In such a case, during air-cooling operation, the usage-side heat exchanger 42 functions as a refrigerant evaporator and the outdoor heat exchanger 47 functions as a refrigerant radiator or condenser.

(7-2) Modification B

The outdoor air temperature sensor 50 is connected to the outdoor unit control part 51 via a cable (not shown) in the embodiment described above, but the outdoor air temperature sensor 50 may also be connected directly to the controller 60. In such a case, the outdoor air temperature sensor 50 performs A/D conversion and sends a digital signal to the controller 60, or the controller 60 receives an analog signal and performs A/D conversion.

(7-3) Modification C

The controller 60 is connected to each part by the cable 601 in the embodiment described above, but any or all of the outdoor unit control part 51, the first power supply part 211, the second power supply part 352, the gas valve opening/closing part 361, and the plug power supply part 372 may be provided in the controller 60.

(7-4) Modification D

The controller 60 is included in the electrical component unit 52 in the embodiment described above, but the present invention is not limited to this configuration. For example, the controller 60 may be provided in the electric component box 14, or may be provided in the outdoor unit 43. Any or all of the storage part 61, switching control part 62, fan unit control part 63, GF unit control part 64, HP unit control part 65, and display control part 66 included in the controller 60 may also be provided at a remote location or the like connected by network of LAN and/or WAN. Any or all of the acquisition part 621, computation part 622, determination part 623, and drive signal generation part 624 included in the switching control part 62 may also be provided at a remote location or the like connected by network of LAN and/or WAN.

(7-5) Modification E

In the embodiment described above, the switching control part 62, the fan unit control part 63, the GF unit control part 64, the HP unit control part 65, and the display control part 66 acquire the control program from the storage part 61. However, such an arrangement is not provided by way of limitation; a configuration may be adopted in which a storage area is provided in each of the fan unit control part 63, the GF unit control part 64, the HP unit control part 65, and the display control part 66, and the control program is stored in each storage area.

(7-6) Modification F

In the embodiment described above, when the outdoor air temperature To is less than the standard value Sv1, the controller 60 causes the GF unit 30 to operate as the heat source unit, and the standard value Sv1 is set to 0 (° C.). However, such an arrangement is not provided by way of limitation; the standard value Sv1 can be changed as appropriate. Specifically, the standard value Sv1 may be set to any value, e.g., −5 (° C.) or 5 (° C.), insofar as the condition is satisfied that operation of the GF unit 30 as the heat source unit is more energy efficient than operation of the HP unit 40 as the heat source unit when the outdoor air temperature To is below the standard value Sv1.

(7-7) Modification G

In the embodiment described above, the controller 60 causes the GF unit 30 to operate as the heat source unit when the outdoor air temperature To is less than the standard value Sv1 at the time of initiation and while the air-warming system 10 is running. However, it is not necessarily essential to control the GF unit 30 so as to operate as the heat source unit when the outdoor air temperature To becomes less than the standard value Sv1 while the system is running, and this control can be omitted. In this case, steps S111 and S116 in the flowchart of FIG. 8 are omitted. It is also possible to omit the control for causing the GF unit 30 to operate as the heat source unit when the outdoor air temperature To is less than the standard value Sv1. In this case, steps S104, S111, and S116 in the flowchart of FIG. 8 are omitted.

(7-8) Modification H

In the embodiment described above, the controller 60 executes control for causing the HP unit 40 to operate as the heat source unit instead of the GF unit 30 when the difference value Dv1 becomes less than the second threshold ΔTh2 while the GF unit 30 is operating as the heat source unit. However, this control is not necessarily essential and can be omitted. In this case, step S112 in the flowchart of FIG. 8 is omitted.

(7-9) Modification I

In the embodiment described above, the controller 60 executes control for causing the GF unit 30 to operate as the heat source unit instead of the HP unit 40 when the difference value Dv1 becomes equal to or greater than the third threshold ΔTh3 while the HP unit 40 is operating as the heat source unit. However, this control is not necessarily essential and can be omitted. In this case, step S117 in the flowchart of FIG. 8 is omitted.

(7-10) Modification J

In the embodiment described above, the controller 60 performs control for switching the heat source unit when the difference value Dv1 becomes less than the second threshold ΔTh2 while the GF unit 30 is operating as the heat source unit, and when the difference value Dv1 becomes equal to or greater than the third threshold ΔTh3 while the HP unit 40 is operating as the heat source unit.

However, such an arrangement is not provided by way of limitation; a predetermined delay time may be provided in the control. For example, the controller 60 may be configured so as to switch the heat source unit to the HP unit 40 when a predetermined time elapses from that the difference value Dv1 becomes less than the second threshold ΔTh2 while the GF unit 30 is operating as the heat source unit. The controller 60 may also be configured so as to switch the heat source unit to the GF unit 30 when a predetermined time elapses from that the difference value Dv1 becomes equal to or greater than the third threshold ΔTh3 while the HP unit 40 is operating as the heat source unit. The heat source unit can thereby be switched when it is certain that a condition is satisfied. The delay time is set to, e.g., 30 seconds or one minute, but these times do not limit the configuration, and a numerical value for the delay time may be set that is appropriate according to the installation environment.

A switch-prevented time period may also be established during which control for switching the heat source unit is prohibited until a predetermined time has elapsed from the time of initiation and a time at which control for switching the heat source unit was executed. Amenity and energy efficiency can thereby be more easily maintained. It is estimated that switching the heat source unit frequently within a short time may reduce amenity and energy efficiency. However, providing the abovementioned switch-prevented time period restrains frequent switching of the heat source unit within a short time. The switch-prevented time period is set to, e.g., 30 minutes. A numerical value for the switch-prevented time period may be set that is appropriate according to the installation environment.

(7-11) Modification K

In the embodiment described above, the acquisition part 621 acquires the outdoor air temperature To, the room temperature Ti, and the set temperature Tp every two seconds, which is the predetermined time, while the air-warming system 10 is running. However, the predetermined time is not limited to two seconds and can be changed as appropriate. For example, while the air-warming system 10 is running, the acquisition part 621 may acquire the outdoor air temperature To, the room temperature Ti, and the set temperature Tp every 0.5 seconds or every minute.

(7-12) Modification L

In the embodiment described above, the first threshold ΔTh1, second threshold ΔTh2, and third threshold ΔTh3 are each set to 5 (° C.). However, such an arrangement is not provided by way of limitation; the first threshold $\Delta Th1$, second threshold $\Delta Th2$, and third threshold $\Delta Th3$ can be changed as appropriate according to the installation environment. Specifically, the first threshold $\Delta Th1$, second threshold $\Delta Th2$, and third threshold $\Delta Th3$ may have any value insofar as the conditions are satisfied that the room temperature Ti can be brought close to the set temperature Tp in less time by causing the GF unit 30 to operate as the heat source unit than by causing the HP unit 40 to operate as the heat source unit when the difference value Dv1 is equal to or greater than the thresholds, and that the room temperature Ti is more easily maintained near the set temperature Tp by causing the HP unit 40 to operate as the heat source unit than by causing the GF unit 30 to operate as the heat source unit when the difference value Dv1 is less than the thresholds.

For example, the first threshold $\Delta Th1$, second threshold $\Delta Th2$, and third threshold $\Delta Th3$ may each be set to 3 (° C.) or 10 (° C.). The first threshold $\Delta Th1$, second threshold $\Delta Th2$, and third threshold $\Delta Th3$ also need not all be set to the same value, and may each be set to a different value. For example, the first threshold $\Delta Th1$ may be set to 6° C., the second threshold $\Delta Th2$ to 8° C., and the third threshold $\Delta Th3$ to 12° C. An appropriate hysteresis value may also be imparted to the first threshold $\Delta Th1$, second threshold $\Delta Th2$, and third threshold $\Delta Th3$ in order to prevent a hunting phenomenon in which the heat source unit is switched frequently within a short time.

INDUSTRIAL APPLICABILITY

The present invention can be used in an air conditioning system provided with a gas furnace unit and a heat pump unit.

What is claimed is:

1. An air conditioning system comprising:
    a heat pump unit including a radiator usable with a refrigerant;
    a gas furnace unit including a heating section configured and arranged to heat passing air;
    a blower configured and arranged to generate an air flow that passes through the radiator and the heating section;
    a first temperature sensor provided in a room, the temperature sensor being configured and arranged to detect an indoor temperature in the room; and
    a controller configured and arranged to control each action of the heat pump unit, the gas furnace unit, and the blower,
        the controller being configured to cause the gas furnace unit to operate as a heat source unit when the indoor temperature is less than a set temperature set by a user and a difference value obtained by subtracting the indoor temperature from the set temperature is equal to or greater than a first threshold at startup,
        the controller being further configured to cause the heat pump unit to operate as the heat source unit when the difference value is less than the first threshold at startup,
        the controller being further configured to prohibit both of switching from the heat pump unit to the gas furnace unit and switching from the gas furnace unit to the heat pump unit until a predetermined time has elapsed, in which the controller starts counting of the predetermined time each time a switching of the heat source unit is executed, and
        the first threshold being set as a value whereby the indoor temperature reaches the set temperature in less time by causing the gas furnace unit to operate as the heat source unit than by causing the heat pump unit to operate as the heat source unit when the difference value is equal to or greater than the first threshold.

2. The air conditioning system according to claim 1, further comprising:
    a second temperature sensor configured and arranged to detect an outdoor air temperature of outside air,
    the controller being further configured to cause the gas furnace unit to operate as the heat source unit regardless of the difference value when the outdoor air temperature is less than a first standard value at startup.

3. The air conditioning system according to claim 1, wherein
    the controller is further configured to cause the gas furnace unit to operate as the heat source unit instead of the heat pump unit when the difference value is equal to or greater than a third threshold while the heat pump unit is operating as the heat source unit.

4. The air conditioning system according to claim 3, further comprising:
    a second temperature sensor configured and arranged to detect an outdoor air temperature of outside air,
    the controller being further configured to cause the gas furnace unit to operate as the heat source unit regardless of the difference value when the outdoor air temperature is less than a first standard value at startup.

5. The air conditioning system according to claim 1, wherein
    the controller is further configured to cause the heat pump unit to operate as the heat source unit instead of the gas furnace unit when the difference value becomes less than a second threshold while the gas furnace unit is operating as the heat source unit.

6. The air conditioning system according to claim 5, wherein
    the controller is further configured to cause the gas furnace unit to operate as the heat source unit instead of the heat pump unit when the difference value is equal to or greater than a third threshold while the heat pump unit is operating as the heat source unit.

7. The air conditioning system according to claim 5, further comprising:
    a second temperature sensor configured and arranged to detect an outdoor air temperature of outside air,
    the controller being further configured to cause the gas furnace unit to operate as the heat source unit regardless of the difference value when the outdoor air temperature is less than a first standard value at startup.

* * * * *